United States Patent
Hayano et al.

(10) Patent No.: US 8,045,103 B2
(45) Date of Patent: Oct. 25, 2011

(54) COLOR FILTER SUBSTRATE AND LIQUID CRYSTAL DISPLAY DEVICE

(75) Inventors: Takayuki Hayano, Matsusaka (JP); Dai Chiba, Matsusaka (JP); Yoshiharu Kataoka, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 265 days.

(21) Appl. No.: 12/442,273

(22) PCT Filed: Jun. 25, 2007

(86) PCT No.: PCT/JP2007/062700
§ 371 (c)(1),
(2), (4) Date: Mar. 20, 2009

(87) PCT Pub. No.: WO2008/047499
PCT Pub. Date: Apr. 24, 2008

(65) Prior Publication Data
US 2010/0085516 A1     Apr. 8, 2010

(30) Foreign Application Priority Data
Oct. 19, 2006   (JP) .................................. 2006-285115

(51) Int. Cl.
*G02F 1/1335* (2006.01)
(52) U.S. Cl. ....................................................... 349/106
(58) Field of Classification Search .................... 349/106
See application file for complete search history.

(56) References Cited

U.S. PATENT DOCUMENTS

| | | |
|---|---|---|
| 2004/0125190 A1 | 7/2004 | Koyama |
| 2005/0259139 A1 | 11/2005 | Niia |
| 2010/0033659 A1* | 2/2010 | Kobayashi .................... 349/106 |

FOREIGN PATENT DOCUMENTS

| | | |
|---|---|---|
| JP | 8-278498 A | 10/1996 |
| JP | 2000-98367 A | 4/2000 |
| JP | 2001-330851 A | 11/2001 |
| JP | 2002-131735 A | 5/2002 |
| JP | 2002-341128 A | 11/2002 |
| JP | 2004-133420 A | 4/2004 |
| JP | 2005-331619 A | 12/2005 |
| JP | 2005-345667 A | 12/2005 |

* cited by examiner

*Primary Examiner* — Sung Pak
(74) *Attorney, Agent, or Firm* — Birch, Stewart, Kolasch & Birch, LLP

(57) ABSTRACT

The present invention provides a color filter substrate which can suppress a reverse tilt domain from being generated in a liquid crystal layer near a boundary between a colored layer and a bank without forming a flattening layer on the colored layer. The color filter substrate of the present invention is a color filter substrate including a substrate, an insulating film having transparency, a bank, and a colored layer, the insulating film being arranged on the substrate, the bank and the colored layer being arranged on the insulating film, the colored layer being surrounded by the bank, wherein a thickness of the insulating film in a region overlapping with the center of the colored layer is smaller than a thickness of the insulating film in a region overlapping with an edge of the colored part.

7 Claims, 16 Drawing Sheets

(a)

(b)

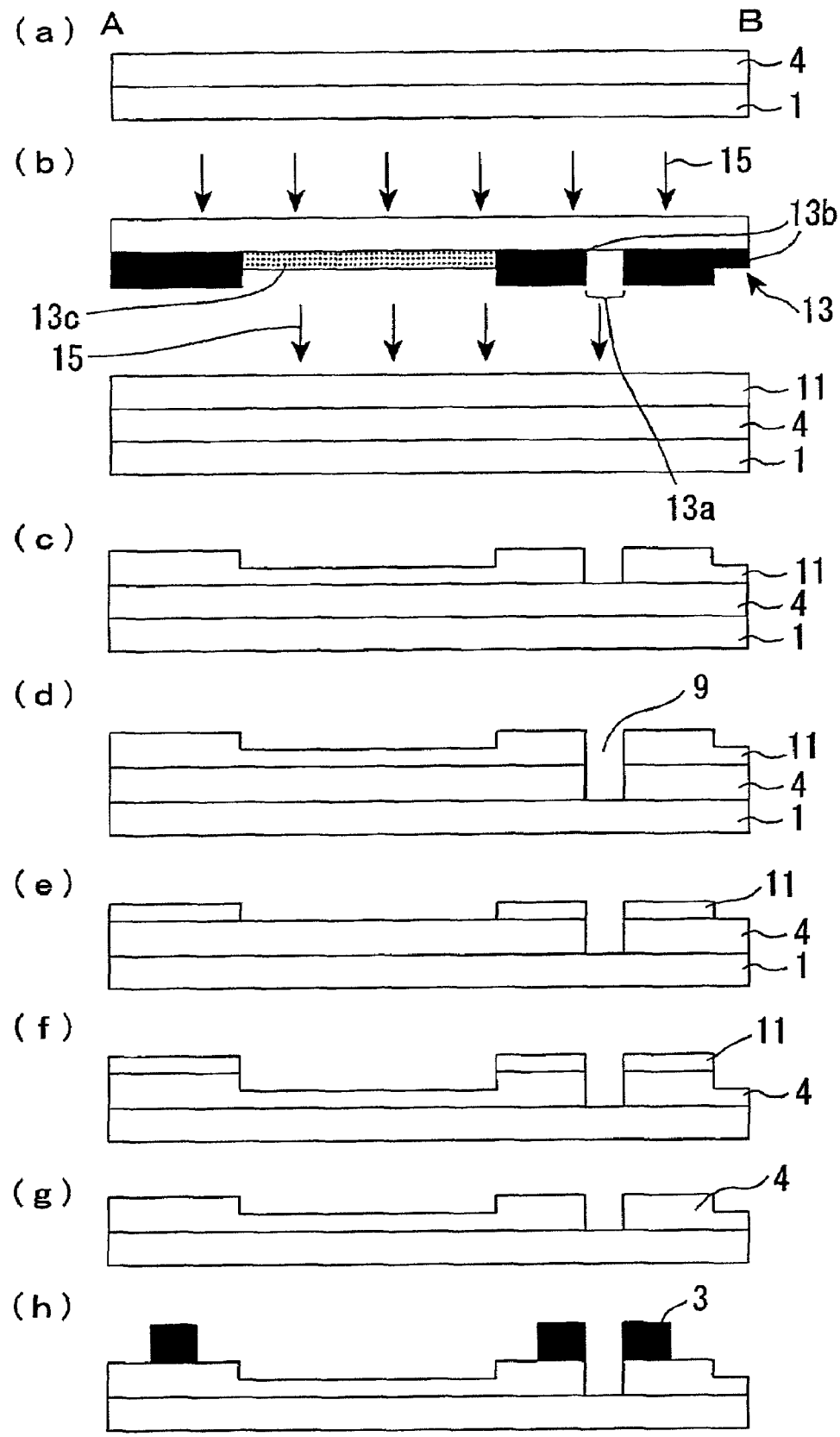

Fig.7-2
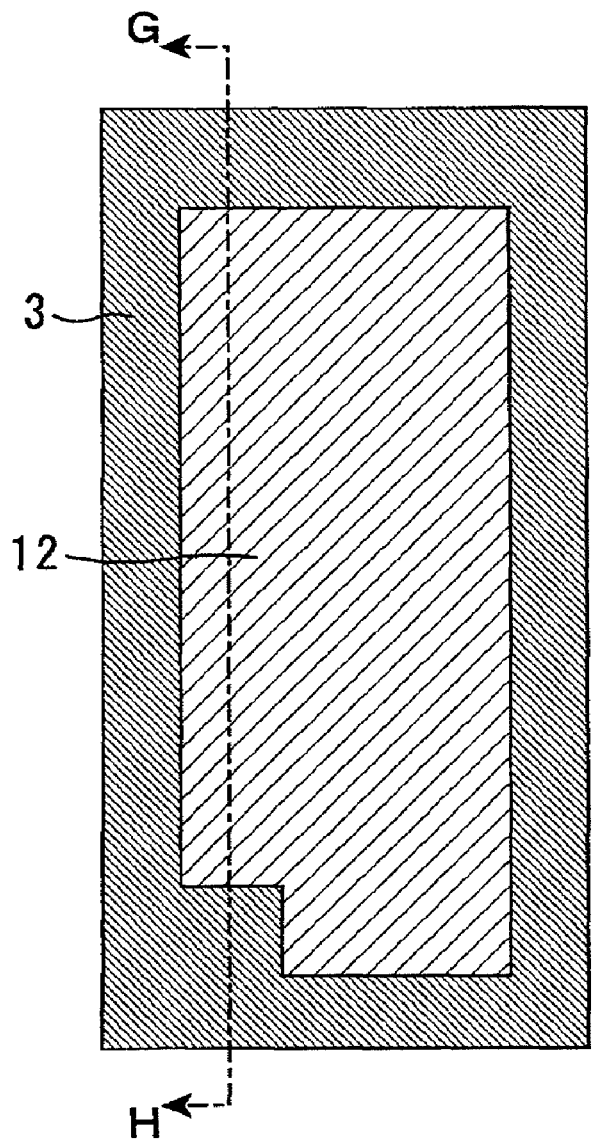
Fig.8-1
(a)
(b)
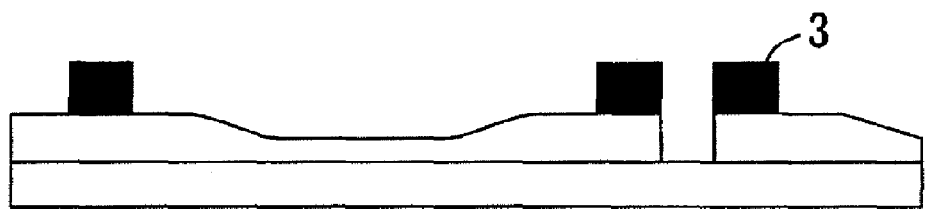

COLOR FILTER SUBSTRATE AND LIQUID CRYSTAL DISPLAY DEVICE

TECHNICAL FIELD

The present invention relates to a color filter substrate and a liquid crystal display device. More specifically, the present invention relates to a color filter substrate where a colored layer is preferably formed by an ink-jet method, and a liquid crystal display device including such a color filter substrate.

BACKGROUND ART

A color filter substrate is used in a liquid crystal display device and the like. The color filter substrate generally includes, on a glass substrate, a black matrix (BM) for shielding a space between color patterns, and colored layers of red (R), green (G), and blue (B) formed in a pixel. Examples of a production method of the color filter substrate include a pigment dispersion method, a staining method, an electrode position method, a printing method, and an ink-jet method. Particularly, according to the ink-jet method, color materials of red (R), green (G), and blue (B) are injected into a region partitioned by the bank while an ink-jet head is moved, and thereby a colored layer pattern is directly formed. This method needs no exposure and development steps, and therefore, a use amount of the material for the colored layers is reduced, and simplified production processes reduces production costs.

Such a color filter substrate is generally arranged as a substrate different from an active matrix substrate for controlling driving of pixels. A Color-filter On Array (COA) structure in which a color filter is formed on the active matrix substrate is now being proposed. According to such a COA structure, there is no need to position pixels on the active matrix substrate with those on the color filter substrate, and a width of a bank pattern can be further decreased. Therefore, an aperture ratio can be improved. An attempt to produce a color filter with a high aperture ratio by combination use of the ink-jet method and the COA technology at low costs has been made (for example, refer to Patent Document 1).

However, as shown in FIG. 13, if a structure in which an insulating film 44 is formed on a substrate 1, and on the insulating film 44, a bank 3 and a colored layer 42 in a region surrounded by the bank 3 are formed is formed by a conventional ink-jet method, the colored layer 42 has a domed surface whose top is positioned in the center. As a result, the entire color filter substrate has an irregular surface. Therefore, a reverse tilt region (domain) in which an alignment direction of liquid crystal molecules in a liquid crystal layer is opposite to its normal direction is generated near the boundary between the colored layer 42 and the bank 3, and at this region, light leakage is caused, which affects display qualities. In this point, there is room for improvement.

Under such a circumstance, a method in which a flattening layer (transparent protective layer) is arranged on the colored layer or the BM to improve the flatness (for example, refer to Patent Documents 1 and 2) has been disclosed. However, if such a method is applied to a CF substrate having the above-mentioned COA structure, a step of additionally forming a contact hole in the flattening layer to connect a pixel electrode to an electrode of a thin film transistor is needed. Such a method still has room for improvement because merits of the ink-jet method, such as simplification of processes and reduction in costs, are not advantageously used.

[Patent Document 1]
Japanese Kokai Publication No. 2002-131735
[Patent Document 2]
Japanese Kokai Publication No. 2002-341128

DISCLOSURE OF INVENTION

The present invention has been made in view of the above-mentioned state of the art. The present invention has an object to provide a color filter substrate capable of suppressing a reverse tilt domain from being generated in a liquid crystal layer near the boundary between a colored layer and a bank without forming a flattening layer on the colored layer. The present invention also has an object to provide a liquid crystal display device.

The present inventors made various investigations on a color filter substrate capable of suppressing a reverse tilt domain from being generated in a liquid crystal layer near the boundary between a colored layer and a bank. The inventors found that the reason why the entire color filter substrate has an irregular surface structure is because a substrate or an insulating film, on which the colored layer is to be formed, has a flat surface. Further, the present inventors found the following. If an insulating film is formed below a region where the colored layer is to be formed and a base insulating film formed below each region where one colored layer is to be formed has a surface shape which sags in the center of the region, that is, if a thickness of the base insulating film in a region overlapping with the center of the region where the colored layer is to be formed is smaller than a thickness of the base insulating film in a region overlapping with an edge of the region where the colored layer is to be formed, the color filter substrate can be formed to have a flat surface and the reverse tilt domain can be sufficiently suppressed from being generated in the liquid crystal layer near the boundary between the colored layer and the bank without forming the flattening layer on the colored layer. As a result, the above-mentioned problems have been admirably solved, leading to completion of the present invention. Also in the color filter in Patent Document 1, a substrate surface is provided with a step derived from an insulating film and an electrode. However, in this embodiment, an aperture ratio is decreased because of the electrode. Further, in this embodiment, a flattening layer is formed on the colored layer. Therefore, the Patent Document 1 has no suggestions to flatten the color filter only by utilizing the shape of the colored layer.

That is, the present invention is a color filter substrate including a substrate, an insulating film having transparency, a bank, and a colored layer, the insulating film being arranged on the substrate, the bank and the colored layer being arranged on the insulating film, the colored layer being surrounded by the bank, wherein a thickness of the insulating film in a region overlapping with the center of the colored layer is smaller than a thickness of the insulating film in a region overlapping with an edge of the colored layer.

The present invention is mentioned in more detail below.

The color filter substrate of the present invention includes an insulating film having transparency on a substrate, and further includes a bank and a colored layer surrounded by the bank on the insulating film. An insulating film having transparency is used as the insulating film. The insulating film having transparency in the present description is not especially limited to one which perfectly (100%) transmits light. For example, an insulating film having a light transmittance of 80% or more can be used. On the insulating film, a bank is arranged corresponding to a shape of the colored layer, and in a region surrounded by the bank, the colored layer is formed.

Attributed to such a colored layer, color display functions can be exhibited. In the present invention, the material, the shape, and the like of the bank are not especially limited as long as the bank is a structure (projection) for partitioning a region where the colored layer is formed.

According to the above-mentioned insulating film, a thickness of the insulating film in the region overlapping with the center of the colored layer is smaller than a thickness of the insulating film in the region overlapping with the edge of the colored layer. In the present description, the edge means a region adjacent to the bank, and the center means a region near the center of the region surrounded by the bank. According to a conventional color filter substrate, the following is concerned. If a colored layer is formed by a coating method such as an ink-jet method, the entire surface of the colored layer has a domed shape, and therefore, a space or a step is generated at the boundary between the colored layer and the bank to generate a reverse tilt domain in the liquid crystal layer, which causes light leakage. In contrast, according to the structure of the present invention, the insulating film, which is formed below the colored layer, sags in the center. Therefore, the entire surface of the color filter substrate can be flattened. That is, according to the color filter substrate of the present invention, the space or the step formed at the boundary between the colored layer and the bank can be made smaller than that in the conventional color filter substrate. Therefore, generation of the reverse tilt domain can be suppressed at the boundary between the colored layer and the bank, and light leakage is decreased, which leads to an improvement in display qualities. The above-mentioned insulating film may be composed of a single layer or a plurality of layers. If the above-mentioned insulating film is composed of a plurality of layers, a layer that is in direct contact with the colored layer may have a uniform thickness between the region overlapping with the center of the colored layer and the region overlapping with the edge of the colored layer as long as the insulating film is in accordance with the present invention as a whole. The above-mentioned insulating film is in accordance with the embodiment of the present invention in at least one region overlapping with the colored layer, and preferably the insulating film is in accordance with the embodiment of the present invention in substantially all of the regions overlapping with each colored layer.

If the colored layer has a flat surface, there is no need to additionally form a flattening layer on the colored layer, which is particularly effective in the case that the COA structure is formed. An ink-jet method in which a material for the colored layer is directly applied is preferable for forming the colored layer. If a flattening layer is formed on the colored layer in the COA structure, the flattening layer needs to be additionally provided with a contact hole for connecting a pixel electrode to a thin film transistor by exposure and development steps and the like. However, according to the present invention, this contact hole-forming step is no needed, and therefore the merits of the ink-jet method such as simplification of processes, e.g., formation of RGB pattern without exposure and development steps, can be fully took advantage of. Accordingly, it is preferable in the color filter substrate of the present invention that the colored layer is formed by an ink-jet method. It is also preferable that the color filter substrate of the present invention includes an active element. The active element in the present description means an element for controlling driving of pixels, such as a TFT and an MIM. The COA structure permits an improvement in aperture ratio.

Preferable embodiments of the present invention are mentioned below in more detail. With regard to the insulating film included in the color filter substrate of the present invention, the following embodiments are mentioned as an embodiment in which a thickness of the insulating film in the region overlapping with the center of the colored layer is smaller than a thickness of the insulating film in the region overlapping with the edge of the colored layer. Embodiments (i) in which the insulating film is provided with a step; and (ii) in which the insulating film sags downwards toward the center of the colored layer.

It is preferable that the insulating film has a surface with a step, and attributed to the step, the thickness of the insulating film in the region overlapping with the edge of the colored layer is larger than the thickness of the insulating film in the region overlapping with the center of the colored layer. The insulating film overlapping with the colored layer has a step between the center and the edge, and an insulating film having a concave shape is formed, and thereon, a colored layer having a convex shape is formed. As a result, the colored layer has a flat surface. According to the present embodiment, only a part of the insulating film is provided with the step, and therefore, such an insulating film can be easily pattern-formed. The number of the step formed in this case is not especially limited.

It is preferable that the insulating film is composed of a plurality of layers, and the number of the plurality of layers in the region overlapping with the edge of the colored layer is larger than the number of the plurality of layers in the region overlapping with the center of the colored layer. That is, according to the present embodiment, the step which is formed between the center and the edge of the insulating film is derived from different insulating films. According to this embodiment, the step which is formed between the center and the edge of the insulating film overlapping with the colored layer can be easily provided for the insulating film surface.

It is preferable that the insulating film has a surface shape which sags downwards toward the center of the colored layer. That is, the surface shape of the insulating film in the present embodiment can be also referred to as a bowl-shape or a U-shape as viewed in cross section. According to this structure, the thickness of the insulating film decreases toward the center of the colored layer in a balanced manner, and the insulating film has a shape symmetry to the domed shape which the colored layer has. Therefore, the flatness of the colored layer surface is more enhanced. As a result, generation of the reverse tilt domain can be more effectively suppressed.

The present invention is a liquid crystal display device including the color filter substrate. The liquid crystal display device of the present invention includes the above-mentioned color filter substrate. Therefore, light leakage caused by the reverse tilt domain which is generated near the boundary between the colored layer and the bank can be suppressed without additionally forming the flattening layer on the colored layer.

EFFECT OF THE INVENTION

According to the color filter substrate of the present invention, light leakage caused by the reverse tilt domain which is generated near the boundary between the colored layer and the bank can be suppressed without additionally forming the flattening layer on the colored layer. According to the color filter substrate of the present invention, the colored layer of the color filter substrate having a COA structure can be preferably prepared by an ink-jet method.

BEST MODES FOR CARRYING OUT THE INVENTION

The present invention is mentioned in more detail below with reference to Examples, using drawings, but the present invention is not limited to only these Embodiments.

Embodiment 1

FIG. 1-1 is a cross-sectional view schematically showing one colored layer unit in a color filter substrate in accordance with Embodiment 1. As shown in FIG. 1-1, a base insulating film 4 is formed on a substrate 1, and on the base insulating film 4, a bank 3 is formed. In each region surrounded by the bank 3, a colored layer 2 is formed. According to the present Embodiment, the bank 3 is made of a photosensitive resin including a black pigment, and the bank 3 also serves as a black matrix (BM). Other photosensitive resins may be used as the material for the bank 3. A glass substrate, a plastic substrate, and the like, can be used as the substrate 1. Three primary colors of red (R), green (G), and blue (B) may be used as a color of the colored layer 2. Three colors of yellow, cyan, and magenta may be used. Further, four or more colors may be used. As a material for the base insulating film 4, transparent inorganic films such as a silicon oxide film and a silicon nitride film, transparent organic resin films, and the like, may be used. If a transparent insulating film material is used, an aperture ratio can be secured in comparison to the case that a step derived from a shielding electrode is formed. If the color filter substrate has a COA structure including an active element, wirings such as a source bus line, a gate bus line, and a storage capacitor (Cs) line, and a TFT for switching a pixel, and the like, are arranged on the substrate 1.

As shown in FIG. 1-1, the base insulating film 4 is provided with a step, and the base insulating film 4 has a structure where the base insulating film 4 sags in the center of one colored layer 2 relative to the edge thereof. That is, according to the base insulating film 4, a thickness b in a region overlapping with the edge of the colored layer 2 is larger than a thickness a in a region overlapping with the center of the colored layer 2. Therefore, the colored layer 2 does not have a domed surface shape, and the entire surface of the color filter substrate has a flat shape. According to the present Embodiment, only a part of the insulating film is provided with the step, and therefore, such an insulating film can be easily pattern-formed.

According to the base insulating film 4 in the present Embodiment, if the thickness of the colored layer 2 is 1.0 to 3.0 µm, for example, the thickness b of the base insulating film 4 in the region overlapping with the edge of the colored layer 2 is larger than the thickness a of the base insulating film 4 in the region overlapping with the center of the colored layer 2 by about 0.5 to 1.0 µm. In this case, with regard to the total thickness of the base insulating film 4 and the colored layer 2 in the region where one colored layer is formed, a difference in the total thickness between the thickest part and the thinnest part can be suppressed to 0.5 µm or less. Therefore, the light leakage caused by the reverse tilt domain generated near the boundary between the edge of the colored layer 2 and the bank 3 can be suppressed. If the difference in thickness between the thickest part and the thinnest part is larger than 1.0 µm, light leakage is generated, possibly resulting in reduction of display qualities.

If the thickness of colored layer 2 is larger than 3.0 µm, the difference in the total thickness of the base insulating film 4 and the colored layer 2 between the thickest part and the thinnest part in the region where one colored layer is formed is further increased. Accordingly, the difference between the thicknesses a and b in the base insulating film 4 needs to be appropriately increased.

The bank 3 formed in the present Embodiment is not limited to the embodiment where the bank 3 is stacked on the base insulating film 4, as shown in FIG. 1-1. As shown in FIG. 1-2, the bank 3 may be formed to reach a depth of the step of the base insulating film 4, or as shown in FIG. 1-3, the bank 3 may be formed to reach a depth of the bottom surface of the base insulating film 4.

The color filter substrate in the present Embodiment can be used as a color filter substrate having a COA structure or as a common color filter substrate. If the color filter substrate in the present Embodiment is used as a color filter substrate having a COA structure, the bank needs to be provided with a contact hole to conduct a pixel electrode to an electrode included in an active element. If the color filter substrate in the present Embodiment is used as a common color filter substrate, there is no need to form a contact hole when the color filter substrate is formed. Accordingly, the production method of the color filter substrate varies depending on the application. Hereinafter, the production method of the color filter substrate in the present Embodiment in each application is mentioned below.

<Color Filter Substrate Having a COA Structure>

FIG. 2-1 is a planar view schematically showing one pixel unit in the case that the color filter substrate in Embodiment 1 is used as a color filter substrate having a COA structure. FIG. 2-1(a) shows one pixel unit before formation of the color filter substrate. FIG. 2-1(b) shows one pixel unit after formation of the color filter substrate. FIG. 2-1(c) shows a position of the step formed in the color filter substrate in detail.

As shown in FIG. 2-1(a), a plurality of source bus lines 5 and gate bus lines 6 are arranged on the substrate 1 to be perpendicular to each other. At each intersection, a thin film transistor (TFT) 8 for controlling driving of a pixel is arranged. Further, a Cs line 7 is arranged between the respective gate bus lines 6 to be parallel to the gate bus line 6.

As shown in FIG. 2-1(b), the colored layer 2 and the bank 3 surrounding the colored layer 2 are arranged on the color filter substrate in the present Embodiment, and thereon, a pixel electrode 20 is formed to overlap with the colored layer 2. The bank 3 is provided with a contact hole 9, and the pixel electrode 20 is conducted to an electrode included in the thin film transistor (TFT) 8 through the contact hole 9. Further, a step 10 is arranged at an edge of the base insulating film 4, on which the colored layer 2 is formed, that is, on the base insulating film 4 surface in a region adjacent to the bank 3, and the thickness of the base insulating film 4 in the region overlapping with the center of the colored layer 2 is smaller than the thickness of the base insulating film 4 in the region overlapping with the edge of the colored layer 2. Because of this structure, the colored layer 2 does not have such a conventional shape as a domed surface whose top is in the center. The entire surface of the color filter substrate has a flat shape.

As shown in FIG. 2-1(c), the step 10 which is formed on the base insulating film 4 is arranged within a distance of about 5 to 10% of each of a width c and a length d of one pixel from the bank 3. This is because, if the colored layer 2 is formed on the conventional color filter substrate by an ink-jet method, a region 30 where the colored layer 2 has a small thickness is arranged within a distance of about 5% of each of the width and the length of the colored layer 2 from the bank 3. That is, the region 30 where the colored layer 2 has a small thickness is arranged at a distance of Δc=c×0.05 in length and a distance of Δd=d×0.05 in width from the bank 3. Accordingly, as in the present Embodiment, the step 10 of the base insulating film 4 is arranged within a distance of about 5 to 10% of each of the width c and the length d from the bank 3. As a result, the layer having a sufficient thickness can be formed in the region 30 where the colored layer 2 has a small thickness conventionally, and the difference in thickness between the edge and the center of the colored layer 2 can be decreased, and thus, the surface can be flattened.

FIG. 2-2 is a planar view schematically showing another embodiment of the present Embodiment. Similarly to FIG. 2-1, FIG. 2-2(a) shows one pixel unit before formation of the color filter substrate. FIG. 2-1(b) shows one pixel unit after formation of the color filter substrate. The present Embodiment is different from the embodiment in FIG. 2-1. The bank 3 is formed also in a region overlapping with the Cs line 7, and a contact hole 9 for drawing the Cs line 7 through the bank 3 is formed. According to this structure, two colored layers are formed in one pixel. Therefore, the pixel electrode 20 is arranged to overlap with the two colored layers. Accordingly, the step 10 is formed in each of the two colored layers.

The colored layer included in the color filter substrate in Embodiment 1 is more preferably prepared by an ink-jet method. The ink-jet method is a method capable of forming RBG patterns without exposure and development steps. If a conventional color filter substrate having a COA structure is formed, a flattening layer is formed on the colored layer, and through the flattening layer, the pixel electrode is connected to the electrode of the TFT, generally. Therefore, the flattening layer needs to be additionally provided with a contact hole by being patterned through exposure and development steps. Therefore, the merits of the ink-jet such as simplification of processes, cannot be fully took advantage of. However, according to the present Embodiment, there is no need to additionally form the flattening layer. Therefore, the merit of the ink-jet method can be effectively utilized.

FIGS. 3-1 and 3-2 are schematic views showing a production flow of the color filter substrate shown in FIG. 2-1. FIG. 3-1 shows a case that the insulating film is made of a nonphotosensitive material. FIG. 3-2 shows a case that the insulating film is made of a photosensitive material. FIGS. 3-1 (a) to 3-1 (h) and FIGS. 3-2 (a) to 3-2 (d) are cross-sectional views schematically showing a color filter substrate in each production stage. Hereinafter, production methods of the color filter substrates of the present Embodiment, different in a material to be used, are mentioned below in more detail. A and B in FIGS. 3-1 and 3-2 correspond to a dashed-dotted line A-B in the cross-sectional view shown in FIG. 2-1(b).

(1) Use of Nonphotosensitive Material
(Formation of Insulating Film)

As shown in FIG. 3-1(a), the insulating film 4 is applied on the substrate 1, first. A glass substrate, a plastic substrate, and the like, can be used as the substrate 1, for example. The substrate 1 includes a source bus line, a gate bus line, a Cs line, and a TFT. A transparent inorganic film made of $SiO_2$, $SiN_x$, and the like, may be used as the insulating film 4, for example. A CVD method, a sputtering method, a spin coating method, and the like, can be used as a method for forming the insulating film 4, for example.

(Exposure)

Then, as shown in FIG. 3-1(b), a resist 11 is applied on the insulating film 4 by a spin coating method and the like, and the resist 11 is exposed to ultraviolet ray (UV) 15 radiation through a mask 13 having a halftone part 13c. The mask 13 used in this step is configured to have a transmissive part 13a corresponding to a region where a contact hole is to be formed, the halftone part 13c corresponding to a region where a lower step is to be arranged, and a shielding part 13b corresponding to other regions. This mask can limit an amount of transmitted light in comparison to a common mask because a treatment for adjusting a thickness of the mask or providing the mask with a fine opening has been provided for the halftone part 13c.

(Development)

Then, as shown in FIG. 3-1(c), development is performed to remove a part of the resist 11, and the resist 11 having a plurality of regions different in thickness is formed.

(1st Etching)

Then, an etching treatment is performed to remove the insulating film 4 below the region where no resist 11 is formed, as shown in FIG. 3-1(d). As a result, the contact hole 9 is formed.

(Resist Ashing)

Then, the resist 11 remaining in the region where the colored layer is to be formed is removed by ashing, as shown in FIG. 3-1(e).

(2nd Etching)

Then, as shown in FIG. 3-1(f), the second etching treatment is performed to provide the insulating film 4 with a step. In this case, if the etching time is too long, the insulating film 4 is perfectly removed. Therefore, the etching time is adjusted in such away that the step of the insulating film 4 has a thickness of about 0.5 to 1.0 μm.

(Resist Stripping)

Then, a resist stripping treatment is performed, thereby perfectly stripping the remaining resist 11, as shown in FIG. 3-1(g). As a result, the insulating film 4 of the present invention is formed.

(Bank Formation)

Then, as shown in FIG. 3-1(h), a photosensitive resin including a black pigment is pattern-formed around the region where the colored layer is to be formed on an upper step of the insulating film 4. As a result, the bank (BM) 3 is formed. Then, the colored layer is formed in the region surrounded by the bank 3, and as a result, the color filter substrate in the present Embodiment is completed.

(2) Use of Photosensitive Material
(Formation of Insulating Film

As shown in FIG. 3-2(a), the insulating film 4 is applied on the substrate 1, first. A glass substrate, a plastic substrate, and the like, can be used as the substrate 1, for example. The substrate 1 includes a source bus line, a gate bus line, a Cs line, and a TFT. A transparent organic resin film and the like can be used as the insulating film 4, for example. A CVD method, a sputtering method, a spin coating method, and the like, can be used as a method for forming the insulating film 4, for example. In addition, a positive material or a negative material may be used as a photosensitive material for the transparent organic resin film. FIG. 3-2 shows a case that a positive material is used, and if a negative material is used, positions of a transmissive part and a shielding part of a mask used in the following process are counterchanged.

(Exposure)

As shown in FIG. 3-2(b), the insulating film 4 is exposed to UV 15 radiation through the mask 13 having the halftone part 13c. The mask 13 used in this step is configured to have a transmissive part 13a corresponding to a region where a contact hole is to be formed, the halftone part 13c corresponding to a region where a lower step is to be arranged, and a shielding part 13b corresponding to other regions. In this case, if an exposure amount is too large, the insulating film 4 which has been exposed to UV radiation is perfectly removed, and therefore, the exposure amount is adjusted in such a way that the step of the insulating film 4 has a thickness of about 0.5 to 1.0 μm.

(Development)

Then, development is performed to form the insulating film 4 having the contact hole 9, as shown in FIG. 3-2(c).

(Bank Formation)

Then, as shown in FIG. 3-2(d), a photosensitive resin including a black pigment is pattern-formed around the region where the colored layer is to be formed on an upper step of the insulating film 4. As a result, the bank (BM) 3 is formed. The colored layer is formed in the region surrounded by the bank 3, and as a result, the color filter substrate in the present Embodiment is completed.

(Common Color Filter Substrate)

FIG. 4 is a planar view schematically showing one pixel unit in the case that the color filter substrate in Embodiment 1 is used as a common color filter substrate. The common color filter substrate is not a substrate including an active element, like a COA structure, but a substrate which is arranged separately from such a substrate. The common color filter substrate generally has no insulating film on a substrate, and it is arranged on the side opposite to the substrate including an active element, with a liquid crystal layer therebetween. The color filter substrate in the present Embodiment includes an insulating film on a substrate, and on the insulating film, includes the colored layer 2 and the bank 3, and the step 10 inside the region where the colored layer 2 is to be formed, as shown in FIG. 4. Similarly to the above-mentioned manner, the step 10 is arranged within a distance of about 5 to 10% of each of a width and a length in one colored layer from the bank 3.

FIGS. 5-1 and 5-2 are schematic views showing a production flow of the color filter substrate, shown in FIG. 4. FIG. 5-1 shows a case that the insulating film is made of a nonphotosensitive material. FIG. 5-2 shows a case that the insulating film is made of a photosensitive material. FIGS. 5-1 (a) to 5-1 (f) and FIGS. 5-2 (a) to 5-2 (d) are cross-sectional views schematically showing the color filter substrate in each production stage. Hereinafter, in each used material, a production method of the color filter substrate in the present Embodiment is mentioned below in more detail. C and D in FIGS. 5-1 and 5-2 correspond to a dashed-dotted line C-D in the cross-sectional view shown in FIG. 4.

(1) Use of Nonphotosensitive Material (Formation of Insulating Film)

As shown in FIG. 5-1(a), the insulating film 4 is applied on the substrate 1, first. A glass substrate, a plastic substrate, and the like, can be used as the substrate 1, for example. A transparent inorganic film made of $SiO_2$, $SiN_x$, and the like, may be used as the insulating film 4, for example. A CVD method, a sputtering method, a spin coating method, and the like, can be used as a method for forming the insulating film 4, for example.

(Exposure)

As shown in FIG. 5-1(b), the resist 11 is applied on the insulating film 4 by a spin coating method and the like, and the resist 11 is exposed to UV 15 radiation through a mask 23. The mask 23 used in this step is configured to have a transmissive part 23a corresponding to a region where a lower step is to be arranged, and a shielding part 23b corresponding to a region where an upper step is to be arranged.

(Development)

Then, development is performed to remove the resist 11 in the region corresponding to the lower step and to remain the resist 11 in the region corresponding to the upper step, as shown in FIG. 5-1(c).

(Etching)

Then, an etching treatment is performed to remove the insulating film 4 in the region where no resist 11 is formed, as shown in FIG. 5-1(d). In this case, if the etching time is too long, the insulating film 4 is perfectly removed. Therefore, the etching time is adjusted in such a way that the step of the insulating film 4 has a thickness of about 0.5 to 1.0 µm. As a result, the insulating film 4 is provided with the step.

(Resist Stripping)

Then, a resist stripping treatment is performed, thereby perfectly stripping the remaining resist 11, as shown in FIG. 5-1 (e). As a result, the insulating film 4 included in the color filter substrate in the present Embodiment is formed.

(Bank Formation)

As shown in FIG. 5-1(f), a photosensitive resin including a black pigment is pattern-formed around the region where the colored layer is to be formed on an upper step of the insulating film 4. As a result, the bank (BM) 3 is formed. Then, the colored layer is formed in the region surrounded by the bank 3, and as a result, the color filter substrate in the present Embodiment is completed.

(2) Use of Photosensitive Material (Formation of Insulating Film)

As shown in FIG. 5-2(a), the insulating film 4 is applied on the substrate 1, first. A glass substrate, a plastic substrate, and the like, can be used as the substrate 1, for example. A transparent organic resin film and the like can be used as the insulating film 4, for example. A CVD method, a sputtering method, a spin coating method, and the like, can be used as a method for forming the insulating film 4, for example. In addition, a positive material or a negative material may be used as a photosensitive material for the transparent organic resin film.

FIG. 5-2 shows a case that a positive material is used, and if a negative material is used, positions of a transmissive part and a shielding part of a mask used in the following process are counterchanged.

(Exposure)

Then, as shown in FIG. 5-2(b), the insulating film 4 is exposed to UV 15 radiation through the mask 23. The mask 23 used in this step has the transmissive part 23a corresponding to a region where a lower step is to be arranged and the shielding part 23b corresponding to a region where an upper step is to be arranged. In this case, if an exposure amount is too large, the insulating film 4 which has been exposed to UV radiation is perfectly removed, and therefore, the exposure amount is adjusted in such a way that the step of the insulating film 4 has a thickness of about 0.5 to 1.0 µm.

(Development)

Then, as shown in FIG. 5-2(c), development is performed to form the insulating film 4 included in the color filter substrate of the present Embodiment.

(Formation of Bank)

Then, as shown in FIG. 5-2(d), a photosensitive resin including a black pigment is pattern-formed around the region where the colored layer is to be formed on an upper step of the insulating film 4. As a result, the bank (BM) 3 is formed. Then, the colored layer 2 is formed in the region surrounded by the bank 3, and as a result, the color filter substrate in the present Embodiment is completed.

In Embodiment 1, compositions of R, G, and B inks are not especially limited. R, G, and B inks each having the following composition can be used, for example.

(Composition of R ink)

Pigment (C.I. pigment red 254): 5 parts by weight

Polymer dispersant (product of AVECIA Ltd., Solspurse 24000): 2 parts by weight

Binder (benzyl methacrylate-methacrylic acid copolymer): 3 parts by weight

Monomer 1 (dipentaerythritol pentaacrylate): 2 parts by weight

Monomer 2 (tripropylene glycol diacrylate): 5 parts by weight Initiator (2-methyl-1-[4-(methylthio) phenyl]-2-morpholinopropane-1-one): 2 parts by weight Solvent (diethylene glycol monobutyl ether acetate, 29.9 dyn/cm): 81 parts by weight (Composition of G Ink)

G ink has the same composition as in the R ink, except that the same amount of C.I. pigment green 36 is included instead of the C.I. pigment red 254 as the pigment.

(Composition of B Ink)

B ink has the same composition as in the R ink, except that the same amount of C.I. pigment blue 15:6 is included instead of the C.I. pigment red 254 as the pigment.

Embodiment 2

FIG. 6 is a cross-sectional view schematically showing one colored layer unit in a color filter substrate in accordance with Embodiment 2. The color filter substrate in the present Embodiment is the same as in Embodiment 1, except for the surface shape of a base insulating film 14. The base insulating film 14 included in the color filter substrate in the present Embodiment has a surface shape which sags downwards toward the center of a colored layer 12, as shown in FIG. 6. That is, the surface shape of the base insulating film 14 in the present Embodiment can be also referred to as a bowl-shape or a U-shape as viewed in cross section. According to such a base insulating film 14 in the present Embodiment, the surface shape gradually sags downwards toward the center of the colored layer 12 in a balanced manner, and the base insulating film 14 has a shape symmetry to the domed shape which the colored layer has. Therefore, the flatness of the colored layer surface is more enhanced. As a result, generation of the reverse tilt domain can be more effectively suppressed. The color filter substrate in the present Embodiment can be also used as the color filter substrate having a COA structure or the common color filter substrate. In addition, if the color filter substrate has a COA structure, the substrate 1 includes wirings such as a source bus line, a gate bus line, and a Cs line, and a TFT for switching a pixel, and the like.

According to the color filter substrate in Embodiment 2 as well as the one in Embodiment 1, if the thickness of the colored layer 12 is 1.0 to 3.0 µm, for example, the thickness b of the base insulating film 14 in the region overlapping with the edge of the colored layer 12 is larger than the thickness a of the base insulating film 14 in the region overlapping with the center of the colored layer 12 by about 0.5 to 1.0 µm. In this case, with regard to the total thickness of the base insulating film 14 and the colored layer 12 in the region where one colored layer is formed, a difference in the total thickness between the thickest part and the thinnest part can be suppressed to 0.5 µm or less. Therefore, the light leakage caused by the reverse tilt domain generated near the boundary between the colored layer 12 and a bank 3 can be suppressed. If the difference in thickness between the thickest part and the thinnest part is larger than 1.0 µm, light leakage is generated, which leads to a reduction in display qualities.

FIGS. 7-1 and 7-2 are planar views schematically showing one pixel unit in the color filter substrate in accordance with Embodiment 2. FIG. 7-1 shows a case that the color filter substrate is used as a color filter substrate having a COA structure. FIG. 7-2 shows a case that the color filter substrate is used as a common color filter substrate.

As shown, in FIGS. 7-1 and 7-2, similarly to Embodiment 1, the colored layer 2 and the bank 3 surrounding the colored layer 2 are formed in the color filter substrate in the present Embodiment. If the color filter substrate in the present Embodiment is used as a color filter substrate having a COA structure, as shown in FIG. 7-1, a plurality of source bus lines 5 and a plurality of gate bus lines 6 are arranged to be perpendicular to each other on the color filter substrate. At an intersection, a TFT 8 for controlling driving of a pixel is arranged. A Cs line 7 is arranged between the gate bus lines 6 to be parallel to the gate bus line 6. Further, the bank 3 is provided with a contact hole 9, thereby conducting a pixel electrode to an electrode included in an active element. On the colored layer 2 and the bank 3, a pixel electrode 20 is arranged. Differently from Embodiment 1, the base insulating film 14 of the present Embodiment has a surface shape which sags downwards toward the center. Therefore, the base insulating film 14 surface has no steps.

FIGS. 8-1 and 8-2 are schematic views showing a production flow of the color filter substrate in the present Embodiment. FIG. 8-1 shows a case that the color filter substrate in the present Embodiment is prepared as a color filter substrate having a COA structure. FIG. 8-2 shows a case that the color filter substrate in the present Embodiment is prepared as a common color filter substrate. FIGS. 8-1 (a) and 8-1 (b) and FIGS. 8-2 (a) and 8-2 (b) are cross-sectional views schematically showing the color filter substrate in each production stage. E and F in FIG. 8-1 correspond to a dashed-dotted line E-F in the cross-sectional view shown in FIG. 7-1. G and H in FIG. 8-2 correspond to a dashed-dotted line G-H in the cross-sectional view shown in FIG. 7-2.

The production method of the color filter substrate in the present Embodiment is almost the same as the production flow shown in FIGS. 3-1 and 3-2, and FIGS. 5-1 and 5-2, but different only in steps after the insulating film is provided with the step, that is, in steps following the steps shown in FIGS. 3-1(g), 3-2 (c), and FIGS. 5-1(e) and 5-2(c). According to the present Embodiment, the step is eliminated by starting heating the insulating film 4 with a hot plate or an oven from the time when the insulating film is provided with the step, thereby melting a part of the insulating film 4. As a result, the insulating film 14 which has a U-shaped depression as viewed in cross section can be formed, as shown in FIGS. 8-1(a) and 8-2(a). Successively, as shown in FIGS. 8-1(b) and 8-2(b), a photosensitive resin including a black pigment is pattern-formed to surround the region where the depression is formed. Thus, the bank 3 (BM) is formed. The colored layer 2 is formed in the region surrounded by the bank 3, and thereby the color filter substrate in the present Embodiment is completed.

According to the present Embodiment, a transparent resin with a thermal deformation property, and the like, is used as a material for the insulating film 14, differently from Embodiment 1. With regard to the transparent resin with a thermal deformation property, an organic material for micro lenses, and the like, can be preferably used as a nonphotosensitive resin, and as a photosensitive resin, a positive photosensitive organic material for micro lenses, and the like, can be preferably used.

Embodiment 3

FIG. 9-1 is a cross-sectional view schematically showing one colored layer unit of the color filter substrate in Embodiment 3. The color filter substrate in the present Embodiment is the same as the color filter substrate in Embodiment 1, except for a layer structure of a base insulating film 24. The base insulating film 24 included in the color filter substrate of the present Embodiment is the same as in Embodiment 1, in that the base insulating film 24 surface is provided with the step, but it is different from that in Embodiment 1 in that the step is derived from two different insulating films 24a and 24b. That is, the base insulating film 24 in the present Embodiment is composed of a plurality of layers, and the number of the layers at the edge of a colored layer 22 is larger than that in the center of the colored layer 22. According to such a structure, the step arranged between the center and the edge of the insulating film overlapping with the colored layer can be easily formed on the insulating film surface.

A bank 3 formed in the present Embodiment is not limited to the embodiment where the bank 3 is stacked on an upper insulating film 24b of the base insulating film 24, as an insulating film 24b that is positioned at an upper part of the base insulating film 24, as shown in FIG. 9-1. As shown in FIG. 9-2, the bank 3 may be formed to reach a surface of an insulating film 24b that is positioned at a lower part of the base insulating film 24, or as shown in FIG. 9-3, the bank 3 may be formed to reach the bottom of the insulating film 24a that is positioned at the lower part.

The color filter substrate in Embodiment 3 is different from the color filter substrate in Embodiment 1 only in that the step is derived from the different layers, but the step itself is the same. Therefore, the color filter substrate which is viewed in plane is the same as those shown in FIGS. 2-1, 2-2, and 4.

According to the color filter substrate in Embodiment 3 as well as the one in Embodiment 1, if the thickness of the colored layer 22 is 1.0 to 3.0 µm, for example, the thickness b of the base insulating film 24 in the region overlapping with the edge is larger than the thickness a of the base insulating film 24 in the region overlapping with the center of the colored layer 22 by about 0.5 to 1.0 µm. In this case, with regard to the total thickness of the base insulating film 24 and the colored layer 22 in the region where one colored layer is formed, a difference in the total thickness between the thickest part and the thinnest part can be suppressed to 0.5 µm or less. Therefore, the light leakage caused by the reverse tilt domain generated near the boundary between the colored layer 22 and the bank 3 can be suppressed. In addition, the step of the base insulating film 24 is arranged within a distance of about 5 to 10% of each of the width and the length of one colored layer from the bank 3.

FIGS. 10-1, 10-2, 11-1, and 11-2 are schematic views each showing a production flow of the color filter substrate in the present Embodiment. FIGS. 10-1 and 10-2 show a case that the color filter substrate is prepared as a color filter substrate having a COA structure. FIG. 10-1 shows a case that a nonphotosensitive resin is used as the upper insulating film material and FIG. 10-2 shows a case that a photosensitive resin is used as the upper insulating film material. FIGS. 11-1 and 11-2 show a case that the color filter substrate is prepared as a common color filter substrate. FIG. 11-1 shows a case that a nonphotosensitive resin is used as the upper insulating film material. FIG. 11-2 shows a case that a photosensitive resin is used as the upper insulating film material. In each case, the production method of the color filter substrate is mentioned below in more detail. A and B in FIGS. 10-1 and 10-2 correspond to a dashed-dotted line A-B in a cross-sectional view schematically shown in FIG. 2-1(b). C and D in FIGS. 11-1 and 11-2 correspond to a dashed-dotted line C-D in a cross-sectional view schematically shown in FIG. 4.

<Color Filter Substrate Having a COA Structure>
(1) Use of Nonphotosensitive Material
(Formation of Lower Insulating Film)

As shown in FIG. 10-1(a), a lower insulating film 24a is formed on the substrate 1, first. A glass substrate, a plastic substrate, and the like, can be used as the substrate 1, for example. The substrate 1 includes a source bus line, a gate bus line, a Cs line, and a TFT. A transparent inorganic film made of $SiO_2$, $SiN_x$, and the like, may be used as the lower insulating film 24a, for example. Further, a CVD method, a sputtering method, a spin coating method, and the like, can be used as a method for forming the lower insulating film 24a, for example.

(Formation of Upper Insulating Film)

Then, as shown in FIG. 10-1(b), an upper insulating film 24b is formed on the lower insulating film 24a. The upper insulating film 24b is preferably formed to have a thickness of about 0.5 to 1 µm. A transparent inorganic film made of $SiO_2$, $SiN_x$, and the like, may be used as the upper insulating film 24b, for example, similarly to the lower insulating film 24a. It is preferable that a material different from the material for the lower insulating film 24a is used. That is, if a $SiO_2$ transparent inorganic film is used as the lower insulating film 24a, a transparent inorganic film made of $SiN_x$ is preferably used as the upper insulating film 24b. In contrast, if a transparent inorganic film made of $SiN_x$ is used as the lower insulating film 24a, a transparent inorganic film of $SiO_2$ is preferably used as the upper insulating film 24b. In addition, a CVD method, a sputtering method, a spin coating method, and the like, can be used as a method for forming the upper insulating film 24b, for example, similarly to the lower insulating film 24a.

(1st Exposure)

Then, as shown in FIG. 10-1(c), the resist 11 is applied on the upper insulating film 24b by a spin coating method and the like, and the resist 11 is exposed to UV 15 radiation through a mask 33. The mask 33 used in this step is configured to have a transmissive part 33a corresponding to a region where the contact hole is to be formed and a region where a lower step is to be arranged, and a shielding part 33b corresponding to other regions.

(1st Development)

As shown in FIG. 10-1(d), development is performed to remove a part of the resist 11.

(1st Etching, Resist Ashing)

An etching treatment is performed to remove the upper insulating film 24b below the region where no resist 11 is formed, as shown in FIG. 10-1(e). According to the present Embodiment, different materials may be used between the lower insulating film 24a and the upper insulating film 24b. In this case, the time for the etching treatment needs not to be strictly adjusted in accordance with a desired thickness, and the insulating film can be patterned to have a proper thickness. Successively, the resist 11 remaining in the region where o colored layer is to be formed is removed by ashing.

(2nd Exposure)

As shown in FIG. 10-1(f), the resist 11 is applied on the upper insulating film 24b and the lower insulating film 24a by a spin coating method and the like, and the resist 11 is exposed to UV 15 radiation through a mask 43. The mask 43 used in this step is configured to have a transmissive part 43a corresponding to a region where a contact hole is to be formed and a shielding part 43b corresponding to other regions.

(2nd Development)

Then, as shown in FIG. 10-1(g), development is performed to remove a part of the resist 11.

(2nd Etching, Resist Stripping)

Then, an etching treatment is performed and the contact hole 9 is formed, and successively, a resist stripping treatment is performed to perfectly strip the remaining resist 11, as shown in FIG. 10-1(h). As a result, the insulating film 24 of the present invention is formed.

(Formation of Bank (BM))

Then, as shown in FIG. 10-1(*i*), a photosensitive resin including a black pigment is pattern-formed around the region where the colored layer is to be formed on the upper insulating film 24*b*. As a result, the bank (BM) 3 is formed. Then, the colored layer is formed in the region surrounded by the bank 3, and as a result, the color filter substrate in the present Embodiment is completed.

(2) Use of Photosensitive Material (Formation of Lower Insulating Film)

As shown in FIG. 10-2(*a*), the lower insulating film 24*a* is applied on the substrate 1. A glass substrate, a plastic substrate, and the like, can be used as the substrate 1, for example. The substrate 1 includes a source bus line, a gate bus line, a Cs line, and a TFT. A transparent inorganic film made of $SiO_2$, $SiN_x$, and the like, may be used as the lower insulating film 24*a*, for example. Further, a CVD method, a sputtering method, a spin coating method, and the like, can be used as a method for forming the lower insulating film 24*a*, for example.

(Formation of Upper Insulating Film)

Then, as shown in FIG. 10-2(*b*), the upper insulating film 24*b* is formed on the lower insulating film 24*a*. The upper insulating film 24*b* is preferably formed to have a thickness of about 0.5 to 1 μm. A transparent photosensitive organic resin film is used as a material for the upper insulating film 24*a*. In this case, a positive material or a negative material may be used as a photosensitive material for the transparent organic resin film. FIG. 10-2 shows a case that a positive material is used, and if a negative material is used, positions of a transmissive part and a shielding part of a mask used in the following process are counterchanged. In addition, a CVD method, a sputtering method, a spin coating method, and the like, can be used as a method for forming the upper insulating film 24*b*, for example, similarly to the lower insulating film 24*a*.

(1st Exposure)

Then, as shown in FIG. 10-2(*c*), the upper insulating film 24*b* is exposed to UV 15 radiation through a mask 33. The mask 33 used in this step is configured to have the transmissive part 33*a* corresponding to a region where the contact hole is formed and a region where a lower step is to be arranged, and the shielding part 33*b* corresponding to other regions. In addition, according to the present Embodiment, different materials may be used between the lower insulating film 24*a* and the upper insulating film 24*b*. In this case, the exposure time needs not to be strictly adjusted in accordance with a desired thickness, and the insulating film can be patterned to have a proper thickness.

(1st Development)

Then, as shown in FIG. 10-2(*d*), development is performed to remove a part of the upper insulating film 24*b*.

(2nd Exposure)

Then, as shown in FIG. 10-2(*e*), the resist 11 is applied on the lower insulating film 24*a* and the upper insulating film 24*b* by a spin coating method and the like, and the resist 11 is exposed to UV 15 radiation through a mask 43. The mask 43 used in this step is configured to have the transmissive part 43*a* corresponding to a region where a contact hole is to be formed and a shielding part 43*b* corresponding to other regions.

(2nd Development)

Then, as shown in FIG. 10-2(*f*), development is performed to remove a part of the resist 11.

(2nd Etching, Resist Stripping)

Then, an etching treatment is performed and the contact hole 9 is formed, and successively, a resist stripping treatment is performed to perfectly strip the remaining resist 11, as shown in FIG. 10-2(*g*). Thus, the insulating film 24 of the present invention is formed.

(Formation of Bank (BM))

Then, as shown in FIG. 10-2(*h*), a photosensitive resin including a black pigment is pattern-formed around the region where the colored layer is to be formed on the upper insulating film 24*b*. As a result, the bank (BM) 3 is formed. Then, the colored layer is formed in the region surrounded by the bank 3. As a result, the color filter substrate in the present Embodiment is completed.

<Common Color Filter Substrate>

(1) Use of Nonphotosensitive Resin (Formation of Lower Insulating Film)

As shown in FIG. 11-1(*a*), the lower insulating film 24*a* is formed on the substrate 1, first. A glass substrate, a plastic substrate, and the like, can be used as the substrate 1. A transparent inorganic film made of $SiO_2$, $SiN_x$, and the like, may be used as the lower insulating film 24*a*, for example. Further, a CVD method, a sputtering method, a spin coating method, and the like, can be used as a method for forming the lower insulating film 24*a*, for example.

(Formation of Upper Insulating Film)

Then, the upper insulating film 24*b* is formed on the lower insulating film 24*a*, as shown in FIG. 11-1(*b*). In this case, the upper insulating film 24*b* is preferably formed to have a thickness of about 0.5 to 1 μm. A transparent inorganic film made of $SiO_2$, $SiN_x$, and the like, may be used as the upper insulating film 24*b*, for example, similarly to the lower insulating film 24*a*. It is preferable that a material different from the material for the lower insulating film 24*a* is used. That is, it is preferable that a transparent inorganic film made of $SiN_x$ is used as the upper insulating film 24*b* if a transparent inorganic film made of $SiO_2$ is used as the lower insulating film 24*a*. If a transparent inorganic film made of $SiN_x$ is used as the lower insulating film 24*a*, it is preferable that a transparent inorganic film made of $SiO_2$ is used as the upper insulating film 24*b*. A CVD method, a sputtering method, a spin coating method, and the like, can be used as a method for forming the upper insulating film 24*b*, for example, similarly to the lower insulating film 24*a*.

(Exposure)

Then, as shown in FIG. 11-1(*c*), the resist 11 is applied on the upper insulating film 24*b* by a spin coating method and the like, and the resist 11 is exposed to UV 15 radiation through a mask 53. The mask 53 used in this step is configured to have a transmissive part 53*a* corresponding to a region where a lower step is to be arranged, and a shielding part 53*b* corresponding to other regions.

(Development)

Then, as shown in FIG. 11-1(*d*), development is performed to remove a part of the resist 11.

(Etching, Resist Ashing)

Then, an etching treatment is performed to remove the upper insulating film 24*b* below a region where no resist 11 is formed. According to the present Embodiment, different materials may be used between the lower insulating film 24*a* and the upper insulating film 24*b*. In this case, the time for the etching treatment needs not to be strictly adjusted in accordance with a desired thickness, and the insulating film can be patterned to have a proper thickness. Successively, the resist 11 remaining in the region where the colored layer is to be formed is removed by ashing.

(Formation of Bank (BM))

Then, as shown in FIG. 11-1(*f*), a photosensitive resin including a black pigment is pattern-formed around the region where the colored layer is to be formed on the upper insulating film 24b. As a result, the bank (BM) 3 is formed. The colored layer is formed in the region surrounded by the bank 3, and as a result, the color filter substrate in the present Embodiment is completed.

(2) Use of Photosensitive Material
(Formation of Lower Insulating Film)

As shown in FIG. 11-2(a), the lower insulating film 24a is applied on the substrate 1, first. A glass substrate, a plastic substrate, and the like, can be used as the substrate 1, for example. The substrate 1 includes a source bus line, a gate bus line, a Cs line, and a TFT. A transparent inorganic film made of $SiO_2$, $SiN_x$, and the like, may be used as the lower insulating film 24a, for example. Further, a CVD method, a sputtering method, a spin coating method, and the like, can be used as a method for forming the lower insulating film 24a, for example.

(Formation of Upper Insulating Film)

Then, the upper insulating film 24b is formed on the lower insulating film 24a, as shown in FIG. 11-2(b). In this case, the upper insulating film 24b is preferably formed to have a thickness of about 0.5 to 1 μm. A photosensitive transparent organic resin film is used as a material for the upper insulating film 24b. In this case, a positive material or a negative material may be used as a photosensitive material for the transparent organic resin film. FIG. 11-2 shows a case that a positive material is used, and if a negative material is used, positions of a transmissive part and a shielding part of a mask used in the following process are counterchanged. In addition, a CVD method, a sputtering method, a spin coating method, and the like, can be used as a method for forming the upper insulating film 24b, for example, similarly to the lower insulating film 24a.

(Exposure)

Then, as shown in FIG. 11-2(c), the upper insulating film 24b is exposed to UV 15 radiation through the mask 53, as shown in FIG. 11-2(c). The mask 53 used in this step is configured to have the transmissive part 53a corresponding to a region where a lower step is to be arranged, and a shielding part 53b corresponding to other regions. According to the present Embodiment, different materials may be used between the lower insulating film 24a and the upper insulating film 24b. In this case, the exposure time needs not to be strictly adjusted in accordance with a desired thickness, and the insulating film can be patterned to have a proper thickness.

(Development)

Then, as shown in FIG. 11-2(d), development is performed to remove a part of the upper insulating film 24b. Thus, the insulating film 24 of the present invention is formed.

(Formation of Bank (BM))

Then, as shown in FIG. 11-2(e), a photosensitive resin including a black pigment is pattern-formed around the region where the colored layer is to be formed on the upper insulating film 24b. As a result, the bank (BM) 3 is formed. Then, the colored layer is formed in the region surrounded by the bank 3, and as a result, the color filter substrate in the present Embodiment is completed.

Embodiment 4

FIG. 12-1 is a cross-sectional view schematically showing one colored layer unit in a color filter substrate in accordance with Embodiment 4. The color filter substrate in the present Embodiment is the same as the color filter substrates in Embodiments 1 and 3, except for a layer structure of a base insulating film 34. The base insulating film 34 included in the color filter substrate in the present Embodiment is the same as in Embodiment 1 in that the base insulating film 34 surface is provided with a step. Further, the base insulating film 34 is the same as in Embodiment 3 in that the step is derived from two different insulating films 34a and 34b, but different in that the insulating film which is in contact with a colored layer 32 is the insulating film that is positioned at the lower part of the base insulating film in Embodiment 3, but it is an insulating film that is positioned at the upper part of the base insulating film in Embodiment 4. That is, according to the insulating film included in the color filter substrate in the present Embodiment, a thickness of the film 34b that is in direct contact with the colored layer 32 has a uniform thickness between the region overlapping with the center of the colored layer and the region overlapping with the edge of the colored layer. Also in such a structure, the step which is arranged between the center and the edge of the insulating film overlapping with the colored layer is easily formed on the insulating film surface.

In addition, a bank 3 formed in the present Embodiment is not limited to the embodiment where the bank 3 is stacked on the insulating film 34b that is positioned at an upper part of the base insulating film 34, as shown in FIG. 12-1. As shown in FIG. 12-2, the bank 3 may be formed to reach a surface of the insulating film 34a that is positioned at a lower part of the base insulating film 34, or as shown in FIG. 12-3, the bank 3 may be formed to reach the bottom of the insulating film 34a that is positioned at the lower part.

The color filter substrate in Embodiment 4 is different from the color filter substrate in Embodiment 1 only in that the step is derived from the different layers, similarly to the color filter substrate in Embodiment 3, but the step itself is the same. Therefore, the color filter substrate which is viewed in plane is the same as those shown in FIGS. 2-1, 2-2, and 4.

According to the color filter substrate in Embodiment 4 as well as the one in Embodiment 1, if the thickness of the colored layer 32 is 1.0 to 3.0 μm, for example, the thickness b of the base insulating film 34 in the region overlapping with the edge of the colored layer 32 is larger than the thickness a of the base insulating film 34 in the region overlapping with the center of the colored layer 32 by about 0.5 to 1.0 μm. In this case, with regard to the total thickness of the base insulating film 34 and the colored layer 32 in the region where one colored layer is formed, a difference in the total thickness between the thickest part and the thinnest part can be suppressed to 0.5 μm or less. Therefore, the light leakage caused by the reverse tilt domain generated near the boundary between the colored layer 32 and the bank 3 can be suppressed. In addition, the step of the base insulating film 34 is arranged within a distance of about 5 to 10% of each of the width and the length of one colored layer from the bank 3.

The production method of the color filter substrate in the present Embodiment is almost the same as the production method of the color filter substrate in Embodiment 3, except for the following points. The color filter substrate in Embodiment 3 is prepared in the following manner. The lower insulating film 24a is formed on the substrate 1, first, and thereon, the upper insulating film 24b is formed. Then, the upper insulating film 24b is patterned by etching and the like. In contrast, the color filter substrate in Embodiment 4 is prepared in the following manner. The lower insulating film 34a is formed on the substrate, first, and the lower insulating film 34a is patterned by etching and the like in the same step as the step which is performed for the upper insulating film 24b in Embodiment 3. Finally, the upper insulating film 34b is entirely formed.

In addition, similarly to Embodiment 1, the colored layers in the color filter substrates in accordance with Embodiments 2 to 4 are also preferably produced by an ink-jet method. Inks used for preparing the color filter substrates in Embodiments 2 to 4 may have the same compositions as in Embodiment 1, respectively.

In addition, the present application claims priority under the Paris Convention and the domestic law in the country to be entered into national phase on Patent Application No. 2006-285115 filed in Japan on Oct. 19, 2006, the entire contents of which are hereby incorporated by reference.

The terms "or more" and "or less" in the present description means that the value described (boundary value) is included.

BRIEF DESCRIPTION OF DRAWINGS

FIG. 1-2 is a cross-sectional view schematically showing one colored layer unit in another embodiment of the color filter substrate in accordance with Embodiment 1.

FIG. 1-3 is a cross-sectional view schematically showing one colored layer unit in another embodiment of the color filter substrate in accordance with Embodiment 1.

FIG. 2-1 is a planar view schematically showing one pixel unit in the case that the color filter substrate in Embodiment 1 is used as a color filter substrate having a COA structure.

FIG. 2-1(a) shows one pixel unit before formation of the color filter substrate.

FIG. 2-2(b) shows one pixel unit after formation of the color filter substrate.

FIG. 2-1(c) shows a position of the step formed in the color filter substrate in detail.

FIG. 2-2 is a planar view schematically showing one pixel unit in another embodiment where the color filter substrate in accordance with Embodiment 1 is used as a color filter substrate having a COA structure.

FIG. 2-2(a) shows the one pixel unit before formation of the color filter substrate. FIG. 2-2(b) shows the one pixel unit after formation of the color filter substrate.

FIG. 3-1 is a schematic view showing a production flow in the case that the color filter substrate in accordance with Embodiment 1 is prepared as a color filter substrate having a COA structure, and showing a case that the insulating film is made of a nonphotosensitive material. FIGS. 3-1(a) to 3-1(h) are cross-sectional views schematically showing the color filter substrate in each production stage.

FIG. 3-2 is a schematic view showing a production flow in the case that the color filter substrate in accordance with Embodiment 1 is prepared as a color filter substrate having a COA structure, and showing a case that the insulating film is made of a photosensitive material. FIGS. 3-2(a) to 3-2(d) are cross-sectional views schematically showing the color filter substrate in each production stage.

FIG. 5-1 is a schematic view showing a production flow in the case that the color filter substrate in accordance with Embodiment 1 is prepared as a color filter substrate having a common structure, and showing a case that the insulating film is made of a nonphotosensitive material. FIGS. 5(a) to 5(f) are cross-sectional views schematically showing the color filter substrate in each production stage.

FIG. 5-2 is a schematic view showing a production flow in the case that the color filter substrate in accordance with Embodiment 1 is prepared as a color filter substrate having a common structure, and showing a case that the insulating film is made of a photosensitive material. FIGS. 5-2(a) to 5-2(d) are cross sectional views schematically showing the color filter substrate in each production stage.

FIG. 7-1 is a planar view schematically showing one pixel unit in the case that the color filter substrate in accordance with Embodiment 2 is used as a color filter substrate having a COA structure.

FIG. 7-2 is a planar view schematically showing one pixel unit in the case that the color filter substrate in accordance with Embodiment 2 is used as a common color filter substrate.

FIG. 8-1 is a schematic view showing a production flow in the case that the color filter substrate in accordance with Embodiment 1 is prepared as a color filter substrate having a COA structure. FIGS. 8-1(a) and 8-1(b) are cross-sectional views schematically showing the color filter substrate in each production stage.

FIGS. 8-2 is a schematic view showing a production flow in the case that the color filter substrate in accordance with Embodiment 1 is prepared as a color filter substrate having a common structure. FIGS. 8-2(a) and 8-2(b) are cross-sectional view schematically showing the color filter substrate in each production stage.

FIG. 9-1 is a cross-sectional view schematically showing one colored layer unit in the color filter substrate in accordance with Embodiment 3.

FIG. 9-2 is a cross-sectional view schematically showing one colored layer unit in accordance with another embodiment of the color filter substrate in accordance with Embodiment 3.

FIG. 9-3 is a cross-sectional view schematically showing one colored layer unit in accordance with another embodiment of the color filter substrate in accordance with Embodiment 3.

FIG. 10-1 is a schematic view showing a production flow in the case that the color filter substrate in accordance with Embodiment 3 is prepared as a color filter substrate having a COA structure, and showing a case that the insulating film is made of a nonphotosensitive material. FIGS. 10-1(a) to 10-1(i) are cross-sectional views schematically showing the color filter substrate in each production stage.

FIG. 10-2 is a schematic view showing a production flow in the case that the color filter substrate in accordance with Embodiment 3 is prepared as a color filter substrate having a COA structure, and showing a case that the insulating film is made of a photosensitive material. FIGS. 10-2(a) to 10-2(h) are cross-sectional views schematically showing the color filter substrate in each production stage.

FIG. 11-1 is a schematic view showing a production flow in the case that the color filter substrate in accordance with Embodiment 3 is prepared as a color filter substrate having a common structure, and showing a case that the insulating film is made of a nonphotosensitive material. FIGS. 11-1(a) to 11-1(f) are cross sectional views schematically showing the color filter substrate in each production stage.

FIG. 11-2 is a schematic view showing a production flow in the case that the color filter substrate in accordance with Embodiment 3 is prepared as a color filter substrate having a common structure, and showing the case that the insulating film is made of a photosensitive material. FIGS. 11-2(a) to 11-2(e) are cross-sectional views schematically showing the color filter substrate in each production stage.

FIG. 12-1 is a cross-sectional view schematically showing one colored layer unit of the color filter substrate in accordance with Embodiment 4.

FIG. 12-2 is a cross-sectional view schematically showing one colored layer unit in accordance with another embodiment of the color filter substrate in Embodiment 4.

FIG. 12-3 is a cross-sectional view schematically showing one colored layer unit in accordance with another embodiment of the color filter substrate in Embodiment 4.

EXPLANATION OF NUMERALS AND SYMBOLS

Figure 1:
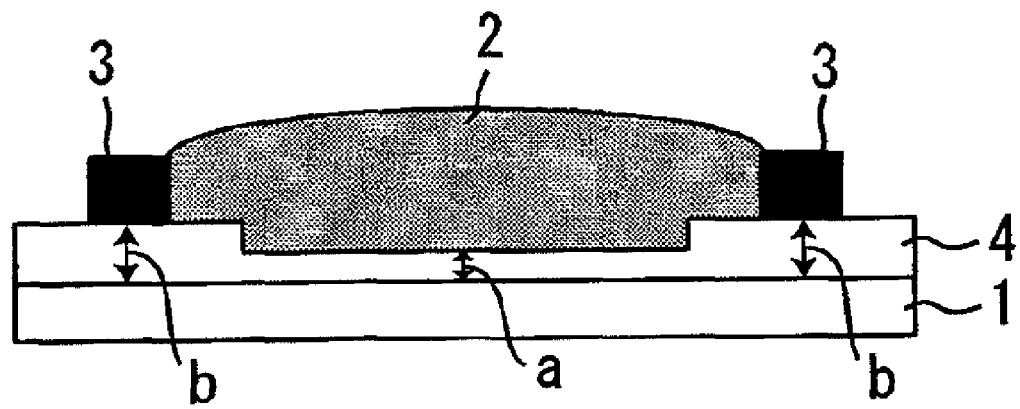
FIG. 1-1 is a cross-sectional view schematically showing one colored layer unit in the color filter substrate in accordance with Embodiment 1.
Figures 1, 2:
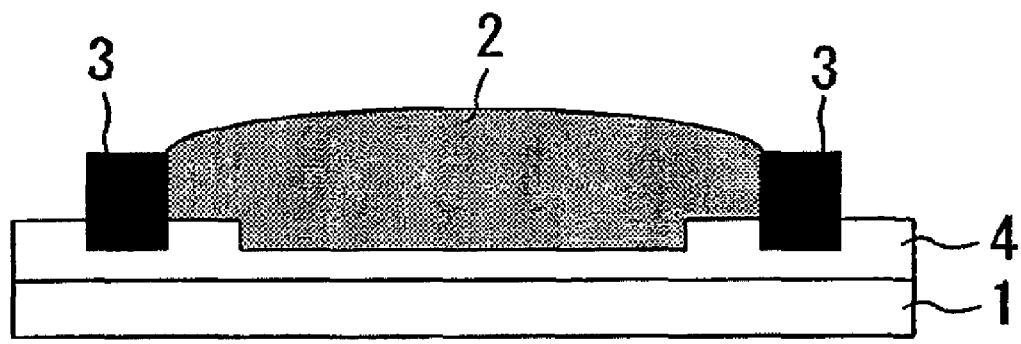
Figures 1, 2, 3:
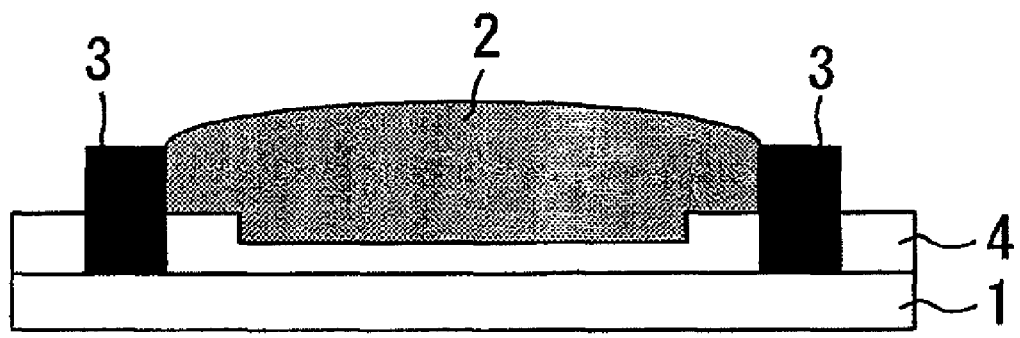
Figures 1, 2:
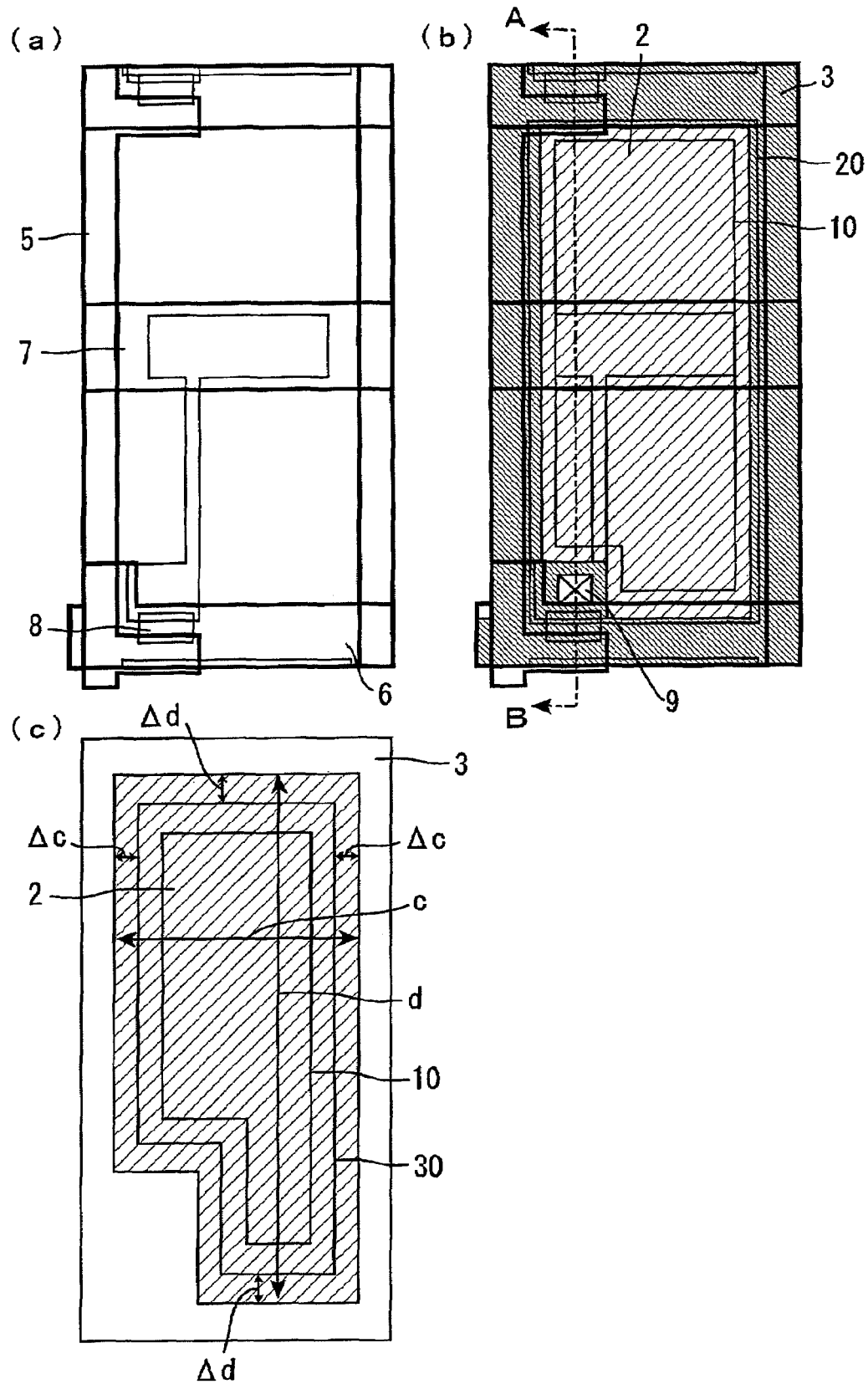
Figure 2:
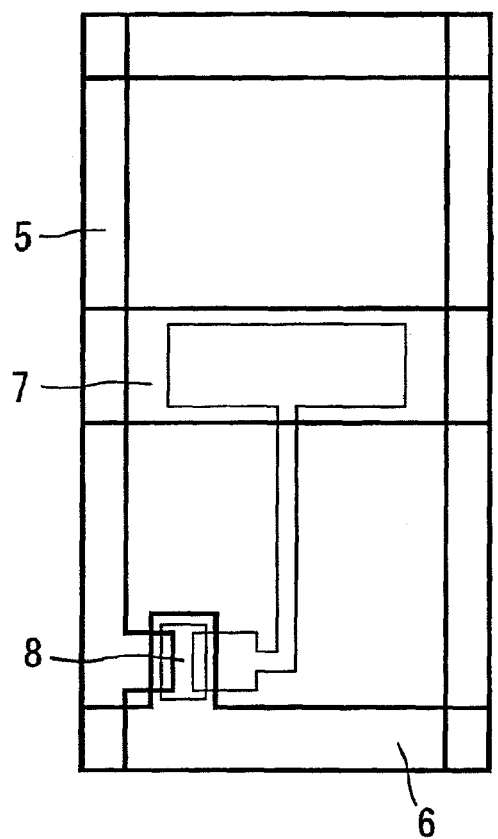
Figure 2:
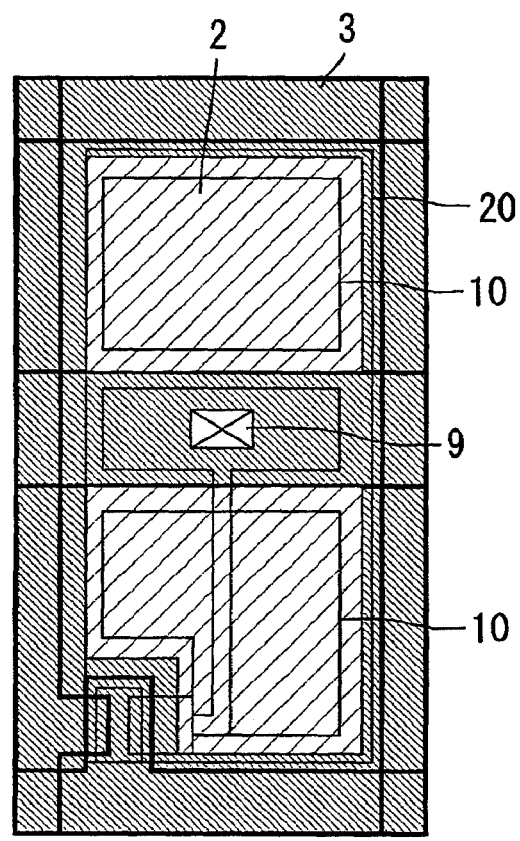
Figures 2, 3:
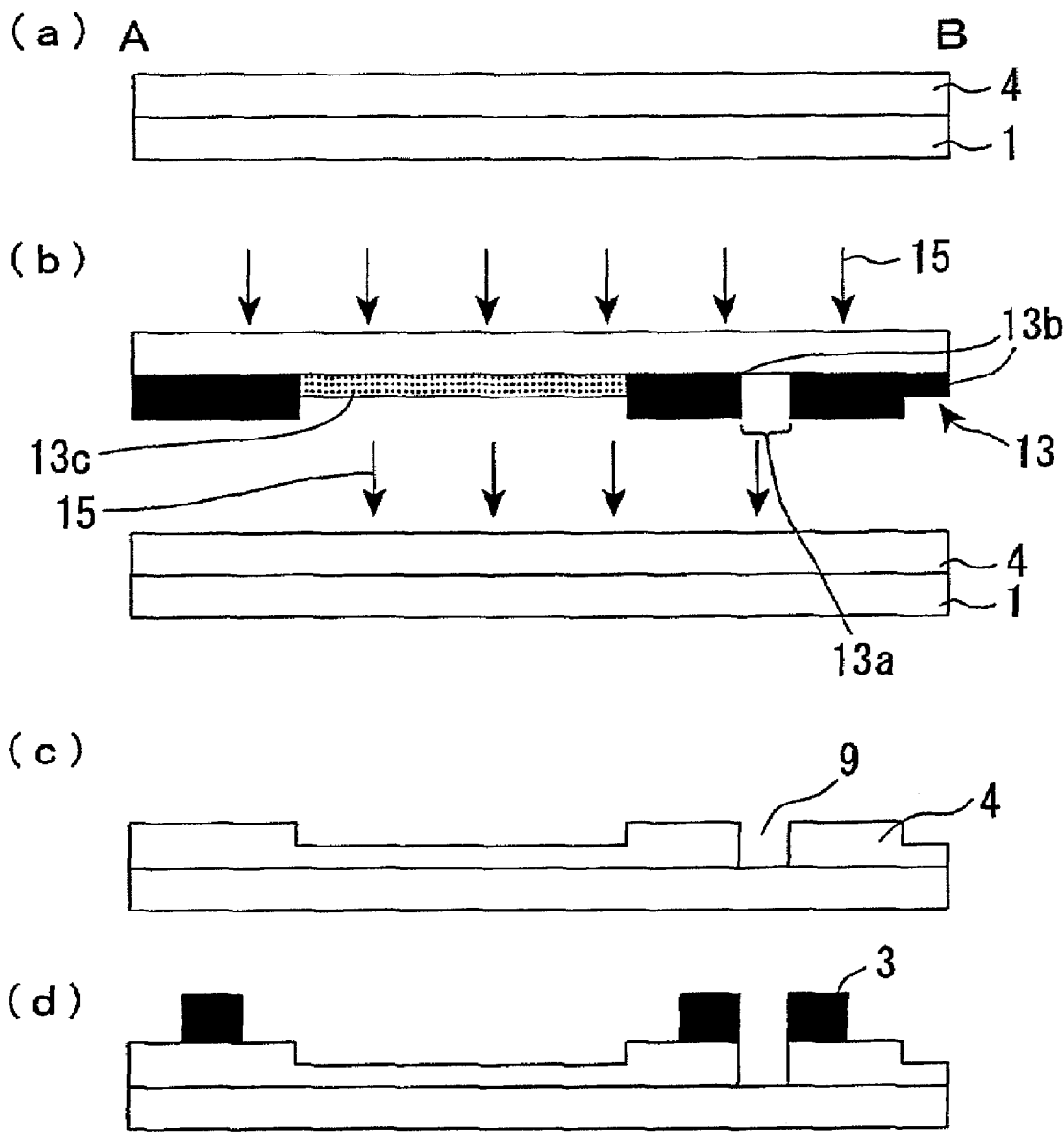
Figure 4:
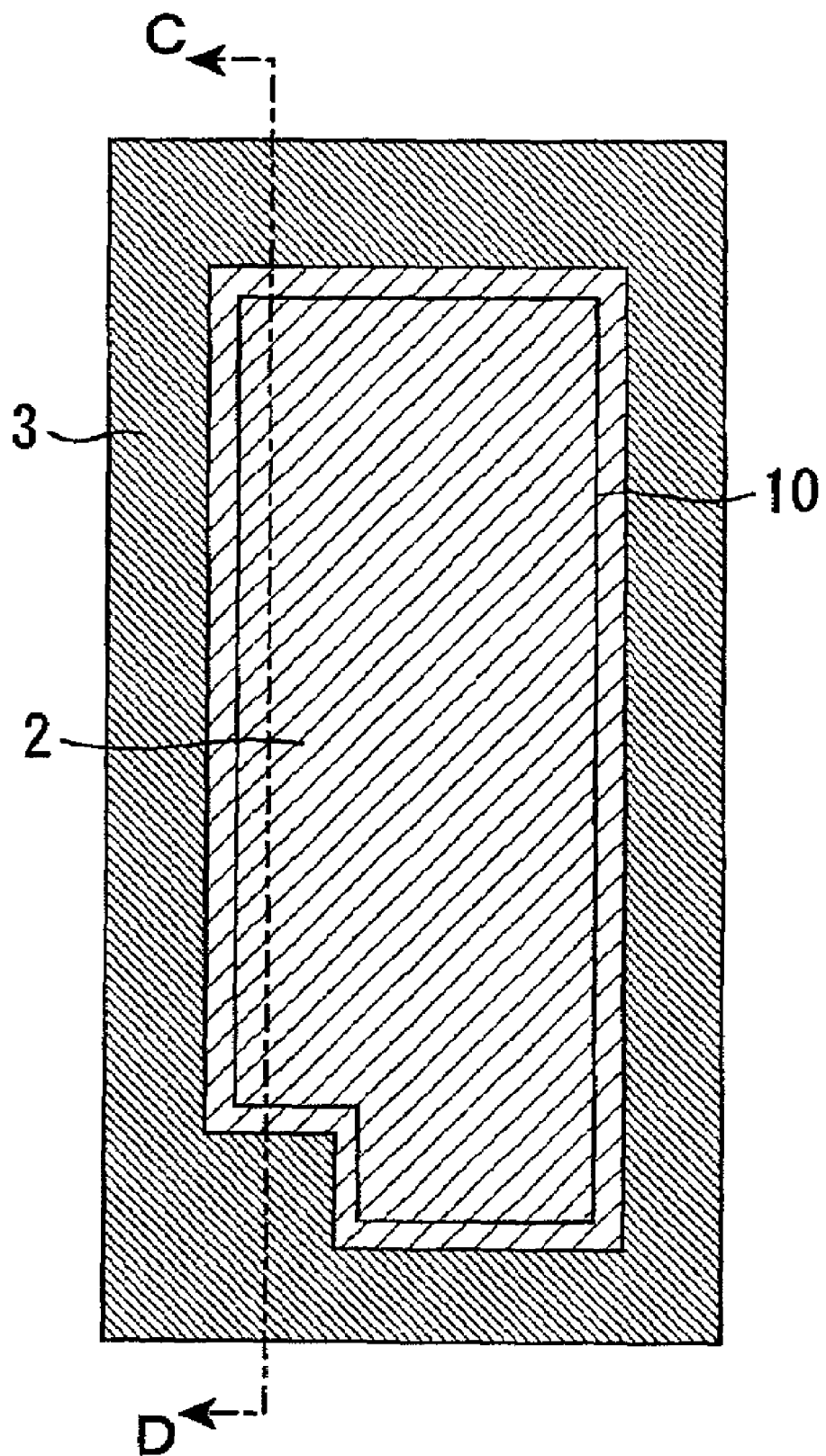
FIG. 4 is a planar view schematically showing one pixel unit in the case that the color filter substrate in accordance with Embodiment 1 is used as a common color filter substrate.
Figures 1, 5:
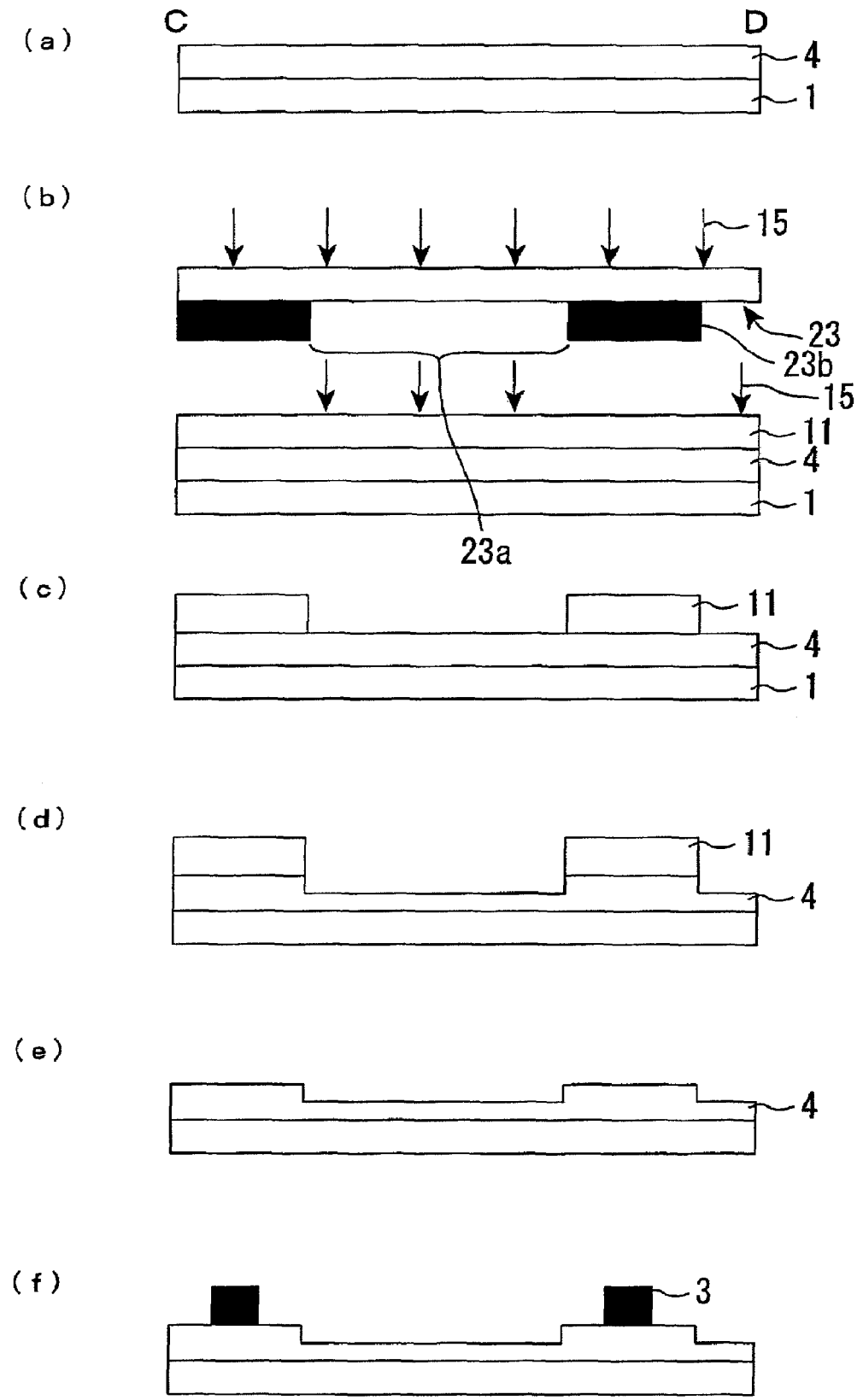
Figures 2, 5:
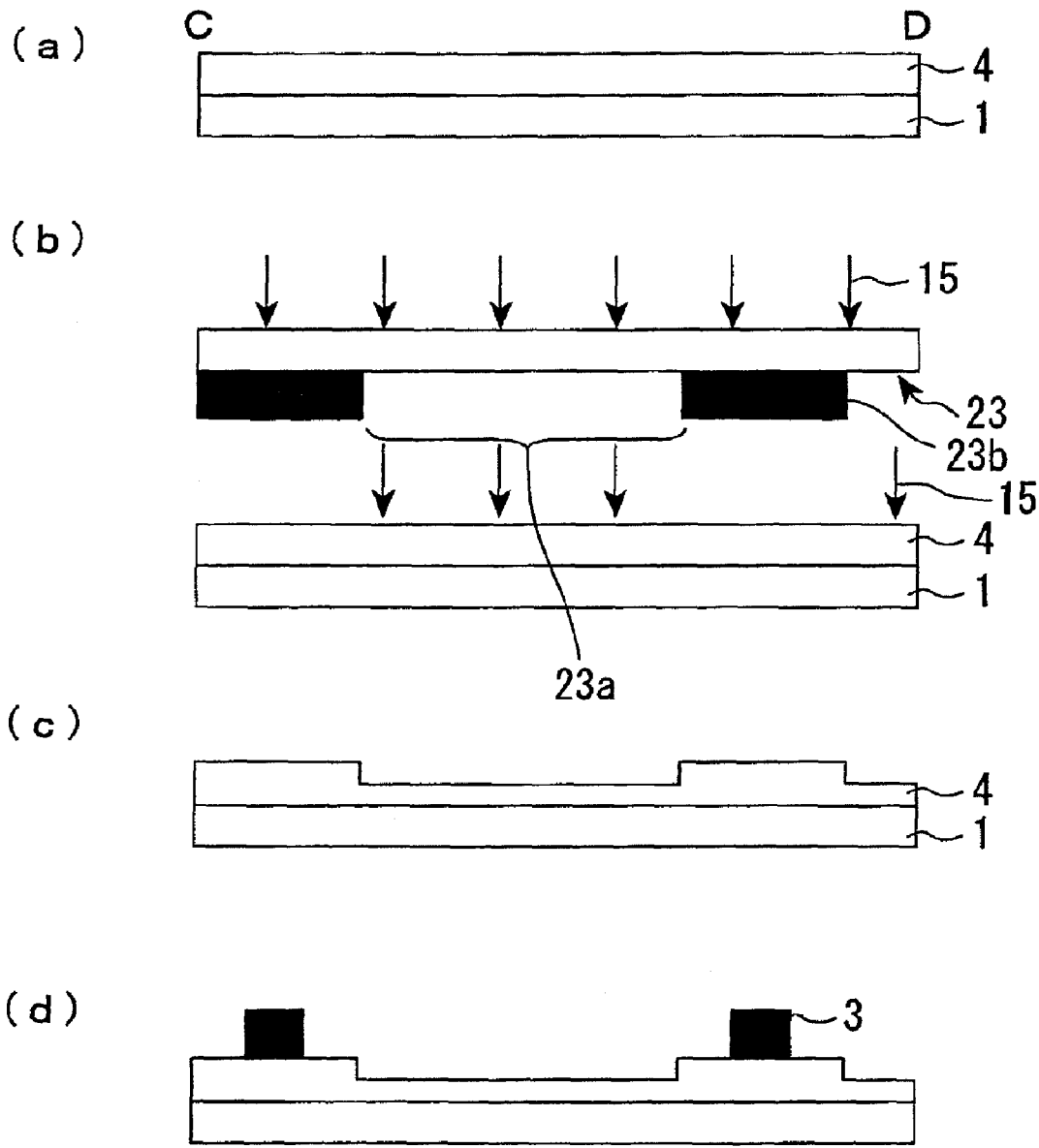
Figure 6:
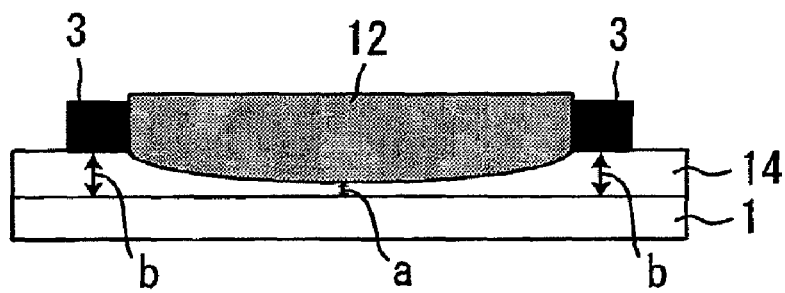
FIG. 6 is a cross-sectional view schematically showing one colored layer unit in the color filter substrate in accordance with Embodiment 2.
Figures 1, 7:
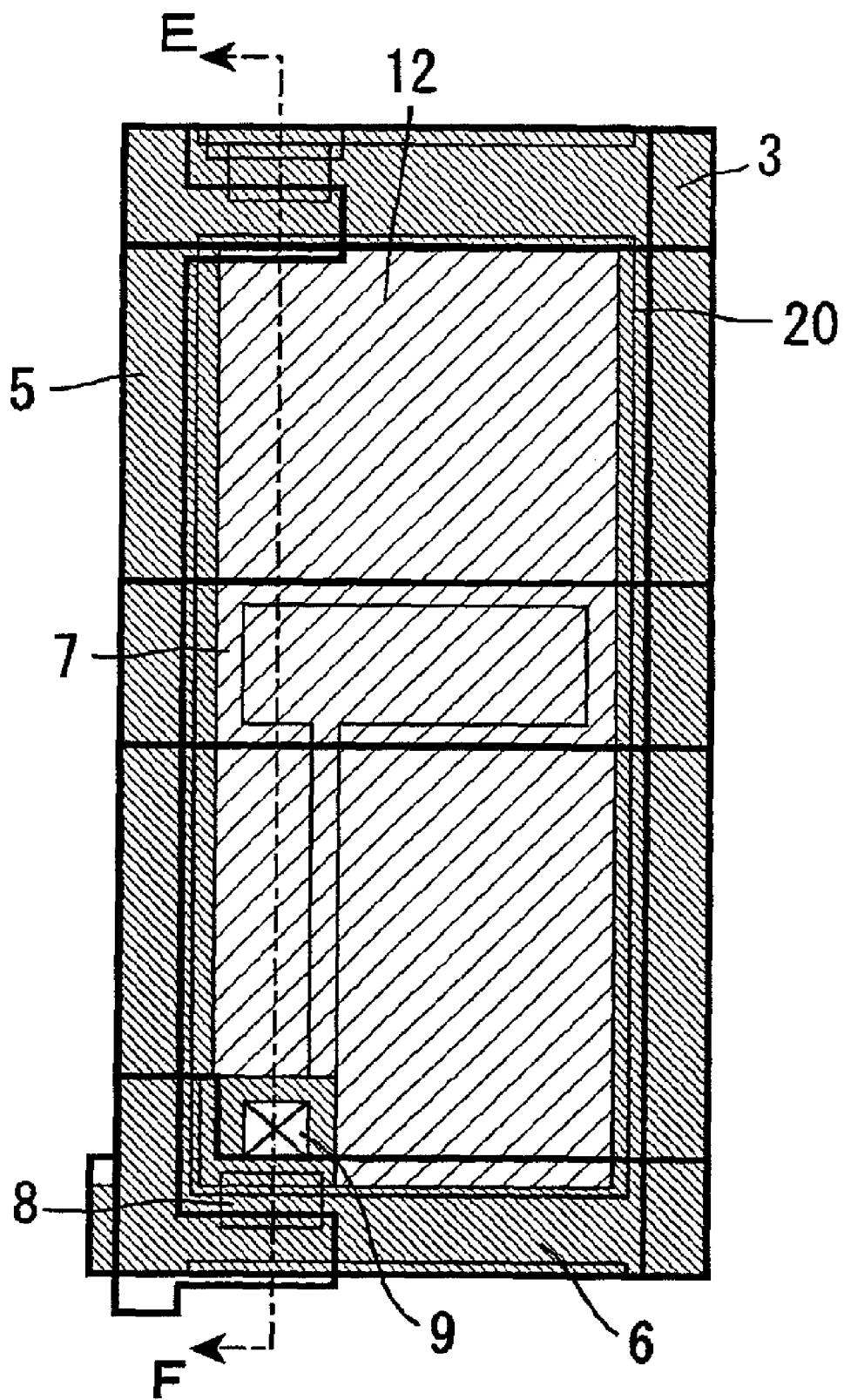
Figures 2, 8:
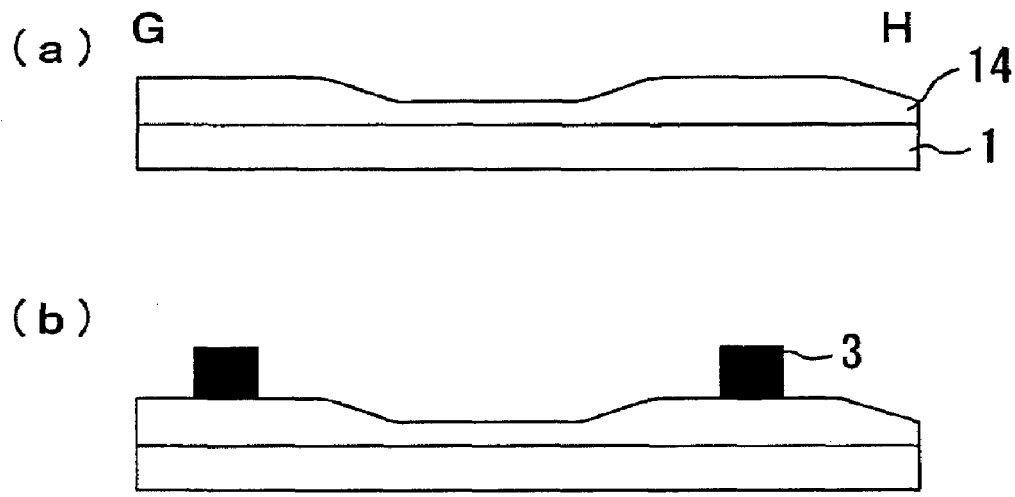
Figures 1, 9:
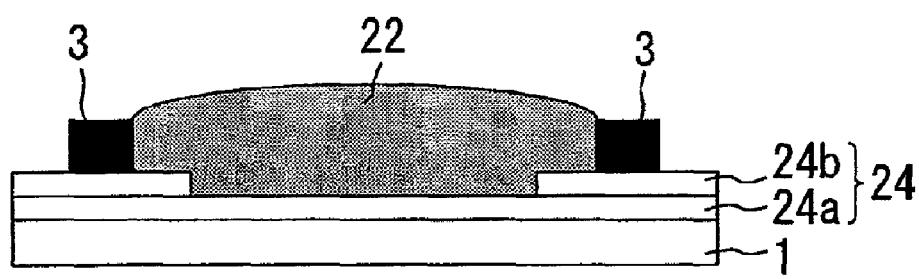
Figures 2, 9:
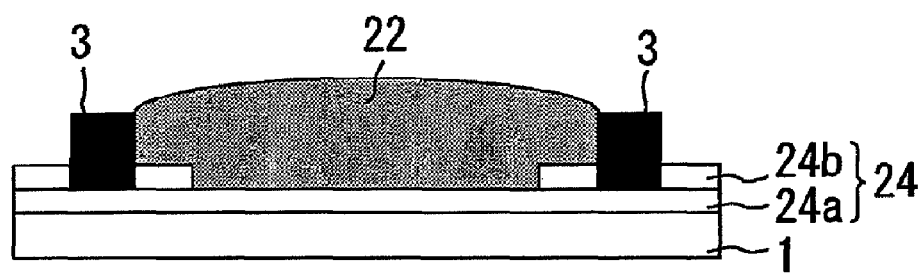
Figures 3, 9:
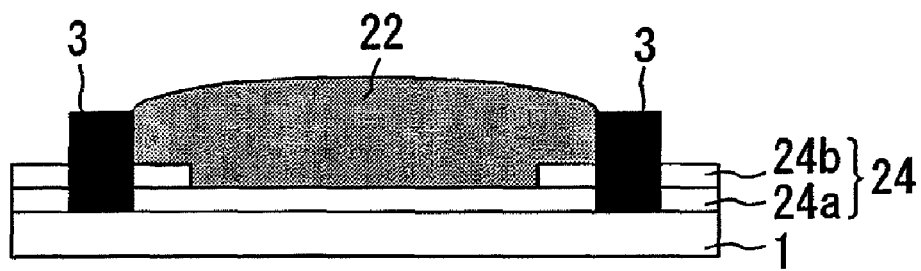
Figures 1, 10:
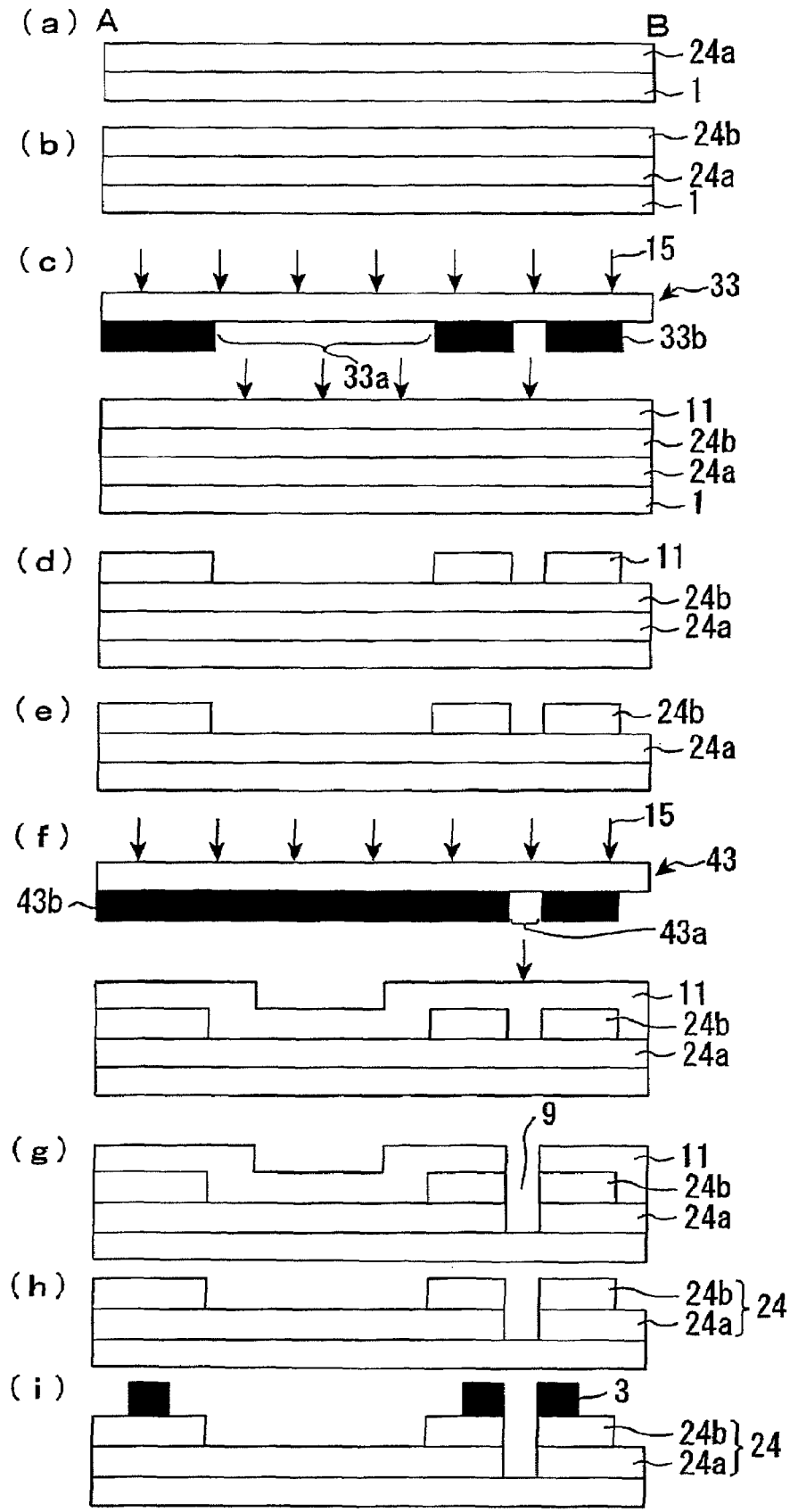
Figures 2, 10:
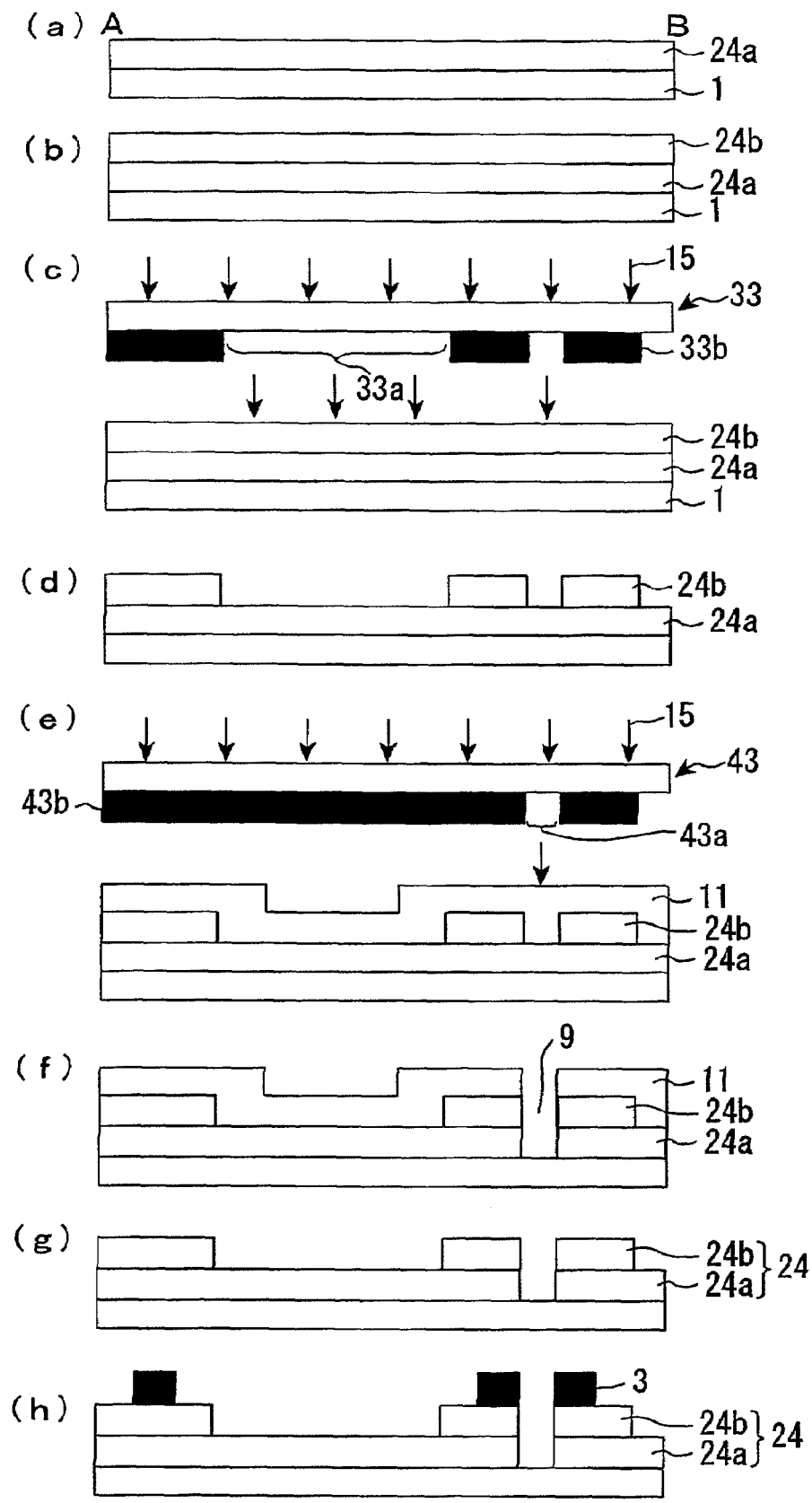
Figures 1, 11:
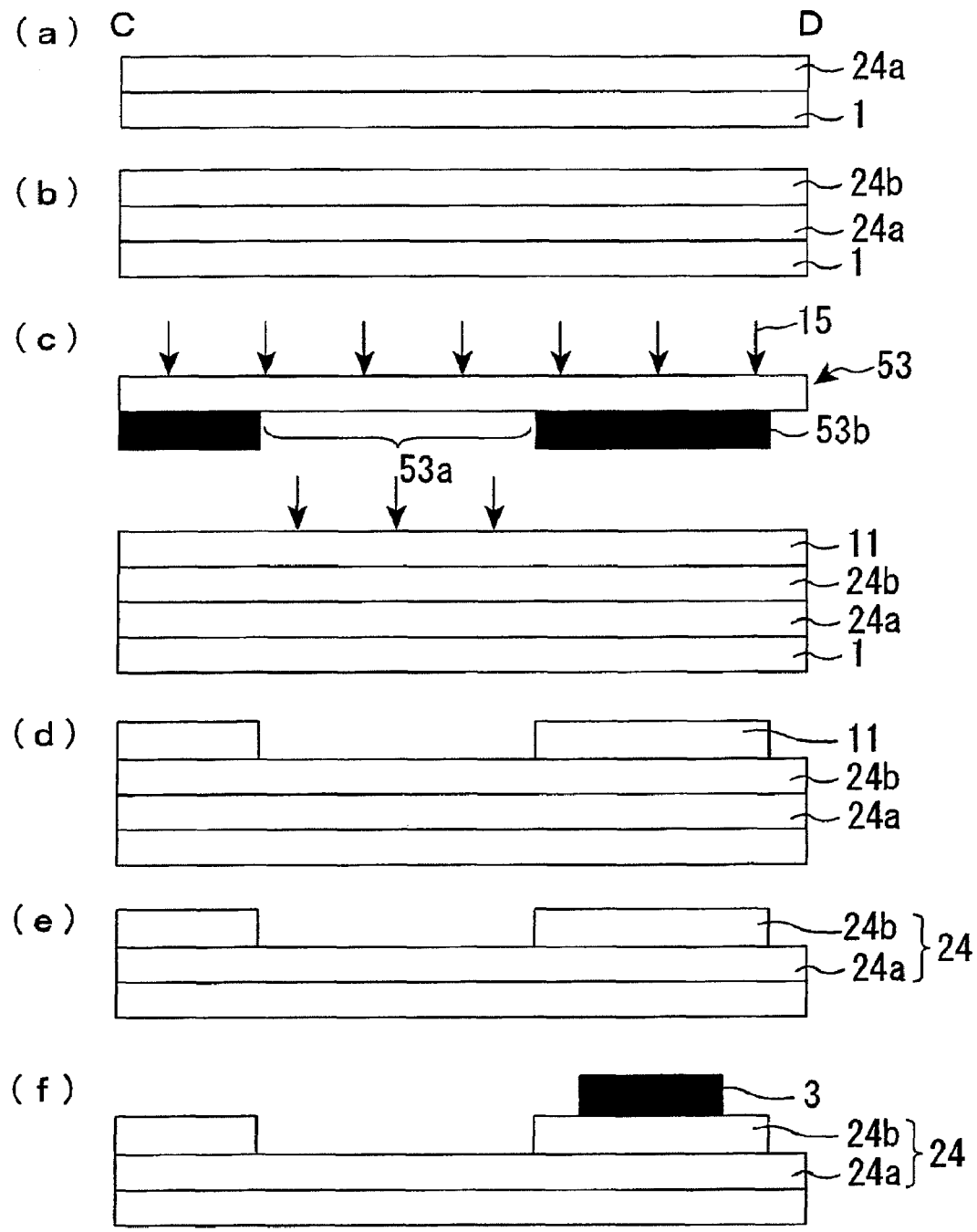
Figures 2, 11:
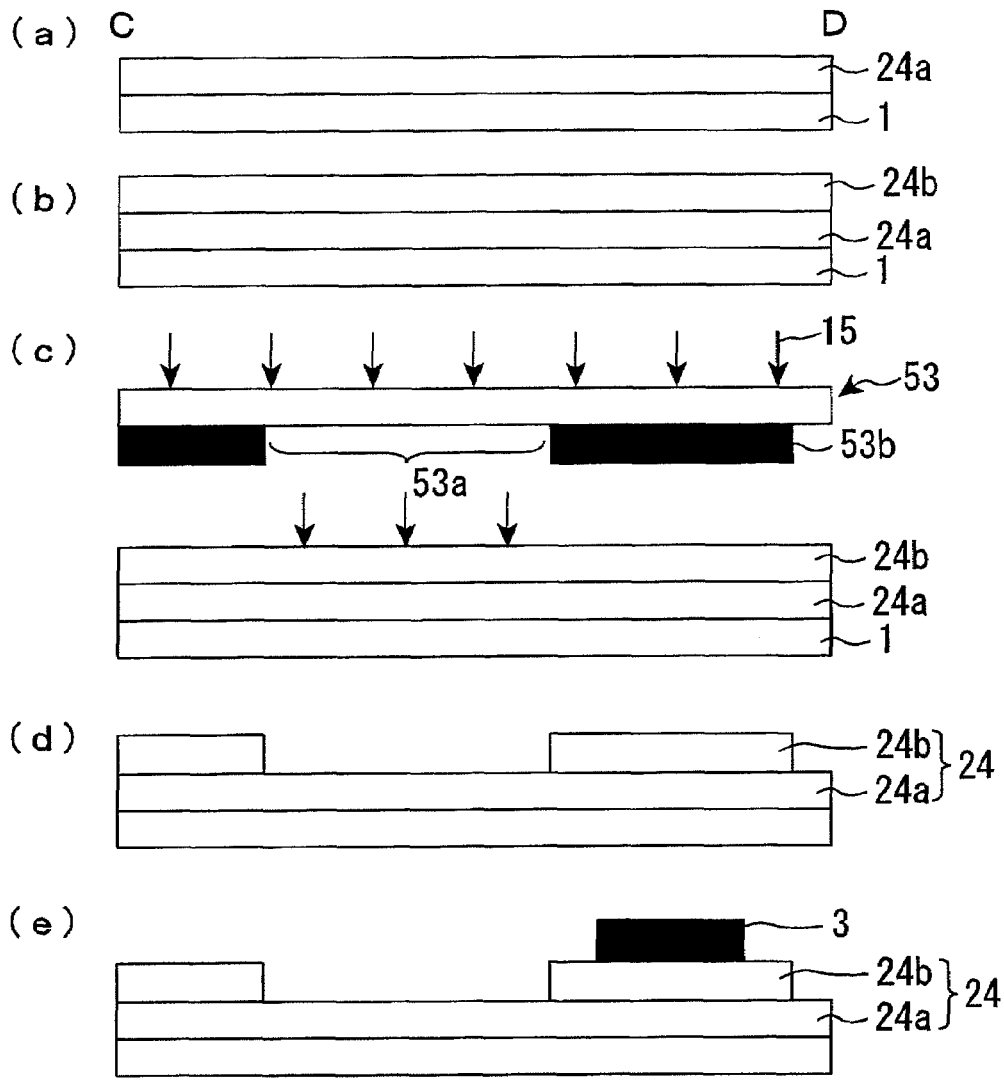
Figures 1, 12:
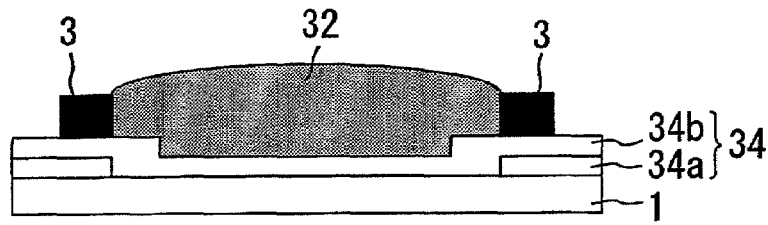
Figures 2, 12:
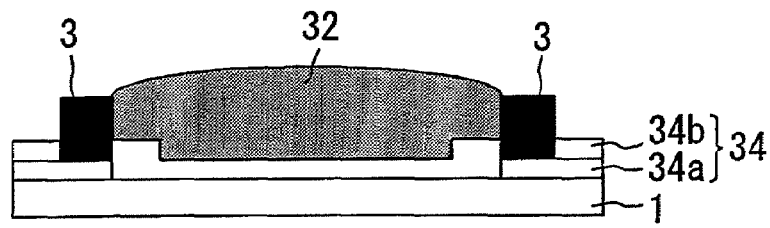
Figures 3, 12:
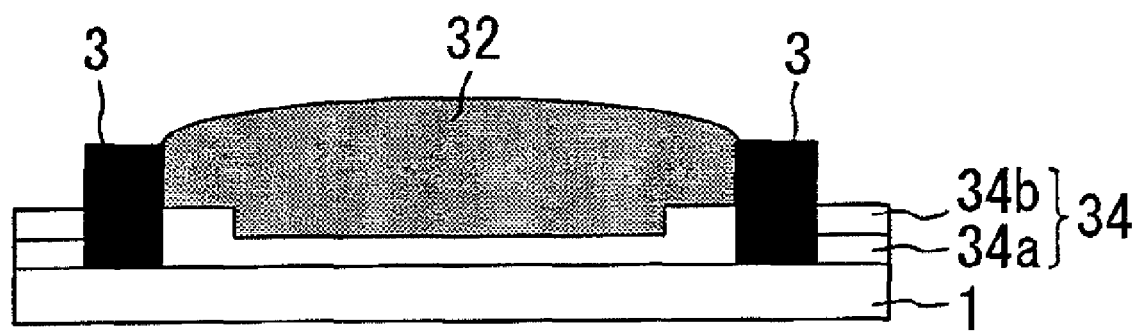
Figure 13:
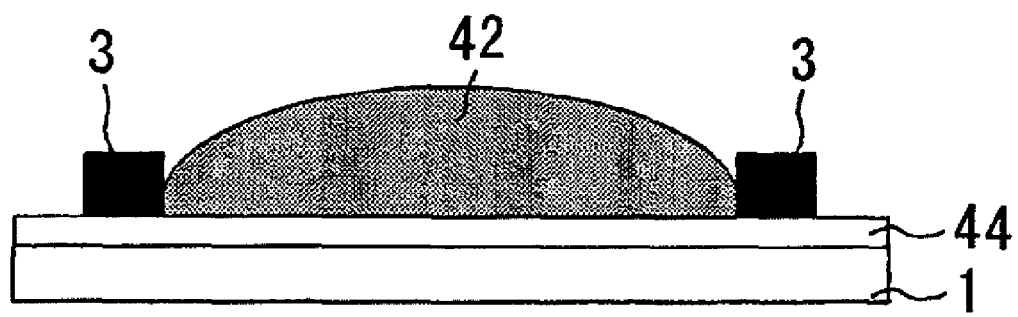
FIG. 13 is a cross-sectional view schematically showing one colored layer unit in a conventional color filter substrate.

1: Substrate
2, 12, 22, 32, 42: Colored layer
3: Bank
4, 14, 24, 34, 44: Base insulating layer
5: Source bus line
6: Gate bus line
7: Storage capacitor (Cs) line
8: Thin film transistor (TFT)
9: Contact hole
10: Step
11: Resist
13, 23, 33, 43, 53: Mask
13a, 23a, 33a, 43a, 53a: Transmissive part
13b, 23b, 33b, 43b, 53b: Shielding part
13c, 23c: Halftone part
15: Ultraviolet ray (UV)
20: Pixel electrode
24a, 34a: Lower insulating film
24b, 34b: Upper insulating film
30: Region where the colored layer has a small thickness

The invention claimed is:

1. A color filter substrate comprising a substrate, an insulating film having transparency, a bank, and a colored layer,
the insulating film being arranged on the substrate,
the bank comprises a black matrix,
the bank and the colored layer being arranged on the insulating film,
the colored layer being surrounded by the bank,
wherein a thickness of the insulating film in a region overlapping with the center of the colored layer is smaller than a thickness of the insulating film in a region overlapping with an edge of the colored layer.

2. The color filter substrate according to claim 1,
wherein the insulating film has a surface with a step, and
attributed to the step, the thickness of the insulating film in the region overlapping with the edge of the colored layer is larger than the thickness of the insulating film in the region overlapping with the center of the colored layer.

3. The color filter substrate according to claim 2,
wherein the insulating film is composed of a plurality of layers, and
the number of the plurality of layers in the region overlapping with the edge of the colored layer is larger than the number of the plurality of layers in the region overlapping with the center of the colored layer.

4. The color filter substrate according to claim 1,
wherein the insulating film has a bowl shape which sags downwards toward the center of the colored layer.

5. The color filter substrate according to claim 1,
wherein the colored layer is formed by an ink-jet method.

6. The color filter substrate according to claim 1, comprising an active element.

7. A liquid crystal display device comprising the color filter substrate of claim 1.

* * * * *